US008972286B2

(12) United States Patent
Grigg et al.

(10) Patent No.: US 8,972,286 B2
(45) Date of Patent: Mar. 3, 2015

(54) TRANSACTION AUTHORIZATION SYSTEM FOR A MOBILE COMMERCE DEVICE

(75) Inventors: David M. Grigg, Rock Hill, SC (US);
Patrick B. Kelly, Charlotte, NC (US);
Alicia C. Jones, Fort Mill, SC (US);
Marc B. Keller, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 464 days.

(21) Appl. No.: 13/017,835

(22) Filed: Jan. 31, 2011

(65) Prior Publication Data

US 2012/0197740 A1    Aug. 2, 2012

(51) Int. Cl.
| G06Q 30/00 | (2012.01) |
| G06Q 20/32 | (2012.01) |
| G06Q 20/20 | (2012.01) |
| H04M 1/725 | (2006.01) |

(52) U.S. Cl.
CPC ............ *G06Q 20/3278* (2013.01); *G06Q 20/20* (2013.01); *H04M 1/72522* (2013.01); *H04M 1/7258* (2013.01)
USPC ...................................................... 705/26.1

(58) Field of Classification Search
USPC ...................................................... 705/26.1
See application file for complete search history.

(56) References Cited

U.S. PATENT DOCUMENTS

| 7,071,113 B2 | 7/2006 | Kim et al. |
| 7,255,264 B2 | 8/2007 | De Leon |
| 8,083,137 B2 | 12/2011 | Tannenbaum |
| 8,706,628 B2 * | 4/2014 | Phillips ........................... 705/41 |
| 2005/0192705 A1 * | 9/2005 | Pinney et al. ................. 700/241 |
| 2006/0021003 A1 | 1/2006 | Fisher |
| 2006/0123465 A1 | 6/2006 | Ziegler |
| 2007/0044041 A1 * | 2/2007 | Beynon et al. ................ 715/862 |
| 2008/0006685 A1 * | 1/2008 | Rackley, III et al. ......... 235/379 |

(Continued)

FOREIGN PATENT DOCUMENTS

GB    2401015 A    10/2004

OTHER PUBLICATIONS

Grigg, David M., et al., U.S. Appl. No. 13/017,823, filed Jan. 31, 2011.

(Continued)

*Primary Examiner* — Seye Iwarere
(74) *Attorney, Agent, or Firm* — Michael A. Springs; Moore & Van Allen, PLLC; Andrew D. Gerschutz

(57) ABSTRACT

Embodiments of the invention include apparatuses and methods that allow a user to wirelessly transmit payment information from a mobile device to a point-of-sale terminal by the user performing only a single action or supplying only a single input to the mobile device. For example, some embodiments of the invention allow a user to assign a default payment vehicle to a particular key or "pay now" icon of the mobile device so that activation of the particular key or icon, alone, causes the mobile device to wirelessly transmit information about the default payment vehicle. In some embodiments of the invention, a user using the single action option of the mobile device does not need to go through an authentication procedure before the mobile device transmits the default payment information. In some embodiments of the invention, if a user uses the single action option, the mobile device is configured to transmit the payment information without needing to first launch an electronic wallet software application installed on the device.

31 Claims, 11 Drawing Sheets

(56) References Cited

U.S. PATENT DOCUMENTS

| | | | |
|---|---|---|---|
| 2008/0010120 A1* | 1/2008 | Chung et al. | 705/14 |
| 2009/0298464 A1* | 12/2009 | Schilling | 455/406 |
| 2010/0051685 A1 | 3/2010 | Royyuru et al. | |
| 2010/0125495 A1 | 5/2010 | Smith et al. | |
| 2010/0202346 A1 | 8/2010 | Sitzes | |
| 2010/0207742 A1* | 8/2010 | Buhot et al. | 340/10.51 |
| 2010/0217707 A1* | 8/2010 | Phillips | 705/41 |
| 2010/0217709 A1* | 8/2010 | Aabye et al. | 705/44 |
| 2010/0223145 A1* | 9/2010 | Dragt | 705/17 |
| 2011/0112952 A1* | 5/2011 | Annunziata et al. | 705/37 |
| 2011/0218871 A1* | 9/2011 | Singh | 705/17 |
| 2013/0097041 A1* | 4/2013 | Fisher | 705/21 |

OTHER PUBLICATIONS

Meyer, Roger. Secure authentication on the internet (Apr. 4, 2007). Retrieved online Mar. 27, 2012. http://www.sans.org/reading_room/whitepapers/securecode/secure-authentication-internet_2084. 36 pps.

* cited by examiner

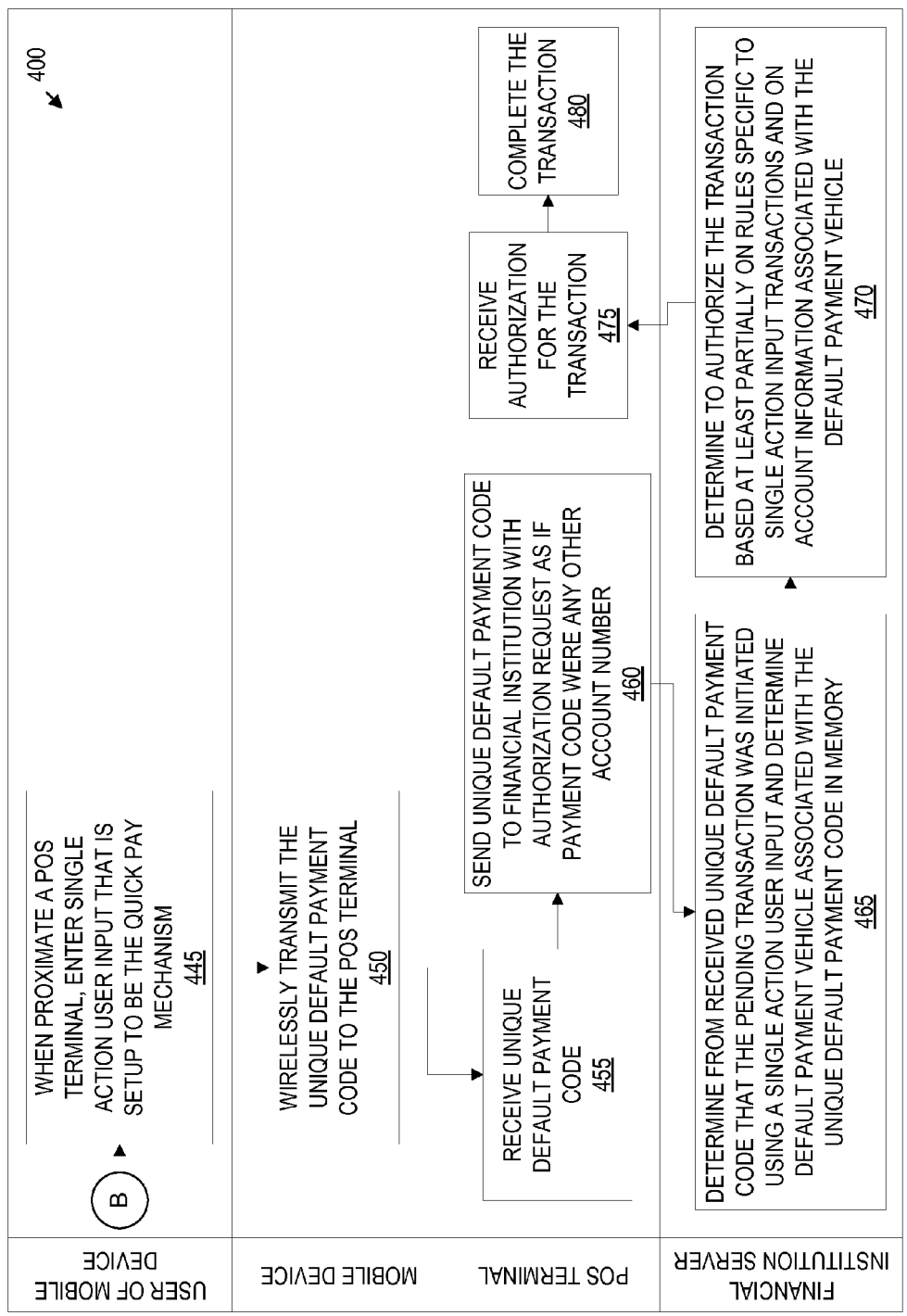

TRANSACTION AUTHORIZATION SYSTEM FOR A MOBILE COMMERCE DEVICE

BACKGROUND

Some people value speed when conducting financial transactions. People are busy and many would prefer not to have to swipe a credit card, count out cash, or write out a check when making a financial transaction. Debit cards and credit cards often require a separate identification (ID) to use. The user must, therefore, carry the ID with them and may need to present it each time a purchase is made, adding time and inconvenience to the transaction. Checks also require separate identification and must be written out, taking up valuable time. Paying for transactions with cash requires that the person carry the cash with them, wait while change is counted out, and risk losing the cash. All of these inconveniences add up to wasted time, effort, and worry for people as they conduct transactions.

Additionally, carrying around credit and debit cards, checks, or cash can be burdensome because they have no secondary functions. A person may not want to carry around all of their credit and debit cards and, therefore, must think ahead of time about where they are going and what cards they want to carry with them.

Thus, there is a need to develop apparatuses and methods that provide fast, convenient authorization of payment for financial transactions. There is also a need to lessen the burden associated with carrying credit cards, checks, cash, and other payment vehicles wherever one goes.

BRIEF SUMMARY

Embodiments of the present invention address the above needs and/or achieve other advantages by providing apparatuses (e.g., systems, computer program products, and/or other devices) and methods that allow a user to wirelessly transmit payment information from a mobile device to a point-of-sale terminal by the user performing only a single action or supplying only a single input to the mobile device. For example, some embodiments of the invention allow a user to assign a default payment vehicle to a particular key or "pay now" icon of the mobile device so that activation of the particular key or icon, alone, causes the mobile device to wirelessly transmit information about the default payment vehicle. In some embodiments of the invention, a user using the single action option of the mobile device does not need to go through an authentication procedure before the mobile device transmits the default payment information. In some embodiments of the invention, if a user uses the single action option, the mobile device is configured to transmit the payment information without needing to first launch an electronic wallet software application installed on the device or at least without needing to fully launch the electronic wallet software.

In particular, according to various embodiments, a mobile phone includes (1) an input device configured to receive input; (2) a wireless transmitter configured to transmit wireless signals to a transaction device; (3) a memory device comprising default payment information stored therein; and a processor communicably coupled to the input device, the wireless transmitter, and the memory device and configured to (a) receive a particular input via the input device and (b) in response to receiving the particular input alone, use the wireless transmitter to wirelessly transmit the default payment information to the transaction device without requiring any additional user input before wirelessly transmitting the default payment information. In some embodiments, the processor is further configured to use the wireless transmitter to wirelessly transmit the default payment information to the transaction device without requiring authentication of the user before wirelessly transmitting the default payment information. In certain embodiments, the wireless transmitter includes a near field communication device configured to transmit wireless near field communication signals including payment information. In some embodiments, the memory device includes an electronic wallet application stored therein, and the processor is configured to use the wireless transmitter to wirelessly transmit the default payment information to the transaction device without requiring the launching of the electronic wallet application prior to wirelessly transmitting the default payment information. In a still further embodiment, the memory includes payment information stored therein about a plurality of payment vehicles associated with the user, and the default payment information is association with one of the plurality of payment vehicles. In some embodiments, the transaction device includes a point-of-sale device.

In certain embodiments, the input device includes a user input device, and the particular input includes a particular user input. In some embodiments, the particular input includes activation of a particular key. In some embodiments, the input device includes a touchscreen and the particular input includes activation of an icon displayed on the touchscreen. In some embodiments, the input device is persistently displayed to the user. In some embodiments, the input device includes a voice recognition system and the particular input includes a user-created verbal phrase. In other embodiments, the input device includes a biometric device and the particular input includes biometric input entered through the biometric device. In still further embodiments, the input device includes a wireless receiver and the particular input includes a wireless signal transmitted from a wireless transmitter associated with or located proximate to the transaction device. In certain embodiments, the input device includes an accelerometer and the particular input includes tapping the mobile phone against a device associated with or proximate to the transaction device. In some embodiments, the particular input includes a combination of user inputs entered simultaneously. In yet still further embodiments, the particular input includes user input that permits a user to wirelessly transmit the default payment information using only a single action of entering the particular input.

In addition, according to various embodiments, the processor is configured to (a) receive a second particular input via an input device; and (b) in response to receiving the second particular input alone, use the wireless transmitter to wirelessly transmit second default payment information to the transaction device without requiring any additional user input before wirelessly transmitting the second default payment information. In some embodiments, the processor is configured to use the wireless transmitter to wirelessly transmit the default payment information to the transaction device immediately after receiving the particular input. In some embodiments, the processor is configured to allow the user to define the particular input and associate it with user-selected default payment information. In still further embodiments, the processor is configured to use the wireless transmitter to wirelessly transmit the default payment information to the transaction device by launching and using an electronic wallet application stored in the memory device. In certain embodiments, the processor is configured to use the wireless transmitter to wirelessly transmit the default payment information to the transaction device by only partially launching an electronic wallet application stored in the memory device. In some embodiments, the processor is configured to permit a user to wirelessly transmit payment information using multiple actions different from the single action. In another embodiment, the processor is configured to alert the user when a balance associated with the default payment information reaches a predetermined threshold.

In further embodiments, the processor is configured to transmit an indicator to the transaction device along with the default payment information, wherein the indicator can be used by one of the transaction device, a merchant's computer system, or a financial institution's computer system to determine that the default payment information was transmitted by the mobile phone using a single action payment feature where the default payment information is wirelessly transmitted to the transaction device without requiring any additional user input before wirelessly transmitting the default payment information. In another embodiment, the default payment information includes a default payment code that can be transmitted by a point-of-sale system to a financial institution's computer system, and then used by the financial institution's computer system to determine a default payment vehicle associated with the default payment code.

According to various embodiments, a method includes: (1) storing information for at least one payment vehicle in memory of a mobile phone; (2) associating particular input received using an input device of the mobile phone; (3) receiving the particular input; and (4) using a wireless transmitter of the mobile phone to wirelessly transmit payment information for the default payment vehicle in response to receiving the particular input alone and without requiring any additional user input before wirelessly transmitting the payment information. In an embodiment, the method includes prompting a user to associate the particular input with the default payment vehicle. In some embodiments, the method includes looking up the default payment vehicle associated with the particular input in the memory in response to receiving the particular input. In some embodiments, the method includes wirelessly transmitting an indicator that the wireless transmittal of payment information was initiated via a single action input with the payment device. In still further embodiments, the method includes analyzing the particular input to determine the payment information to wirelessly transmit. In one embodiment, analyzing the particular input includes evaluating verbal input using speech recognition software. In some embodiments, the method includes establishing a secure connection with a point of sale device prior to transmitting the payment information.

In certain embodiments, the method includes: (1) receiving account information associated with the default payment vehicle; and (2) determining whether the payment information can be wirelessly transmitted based on predetermined rules, wherein the payment information is wirelessly transmitted if the account information conforms to the predetermined rules. In some embodiments, the method includes authenticating an identity of a user based on the particular input. In one embodiment, authenticating the identity of the user includes evaluating a biometric of the user. In some embodiments, the biometric is selected from the group consisting of a fingerprint, a facial scan, voice recognition, and an iris scan.

In an exemplary embodiment, the method includes: (1) storing default payment information in memory of a mobile phone; (2) associating particular input received using an input device of the mobile phone with the default payment information; (3) receiving the particular input; and (4) using a wireless transmitter of the mobile phone to wirelessly transmit the default payment information in response to receiving the particular input alone and without requiring any additional user input before wirelessly transmitting the default payment information.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
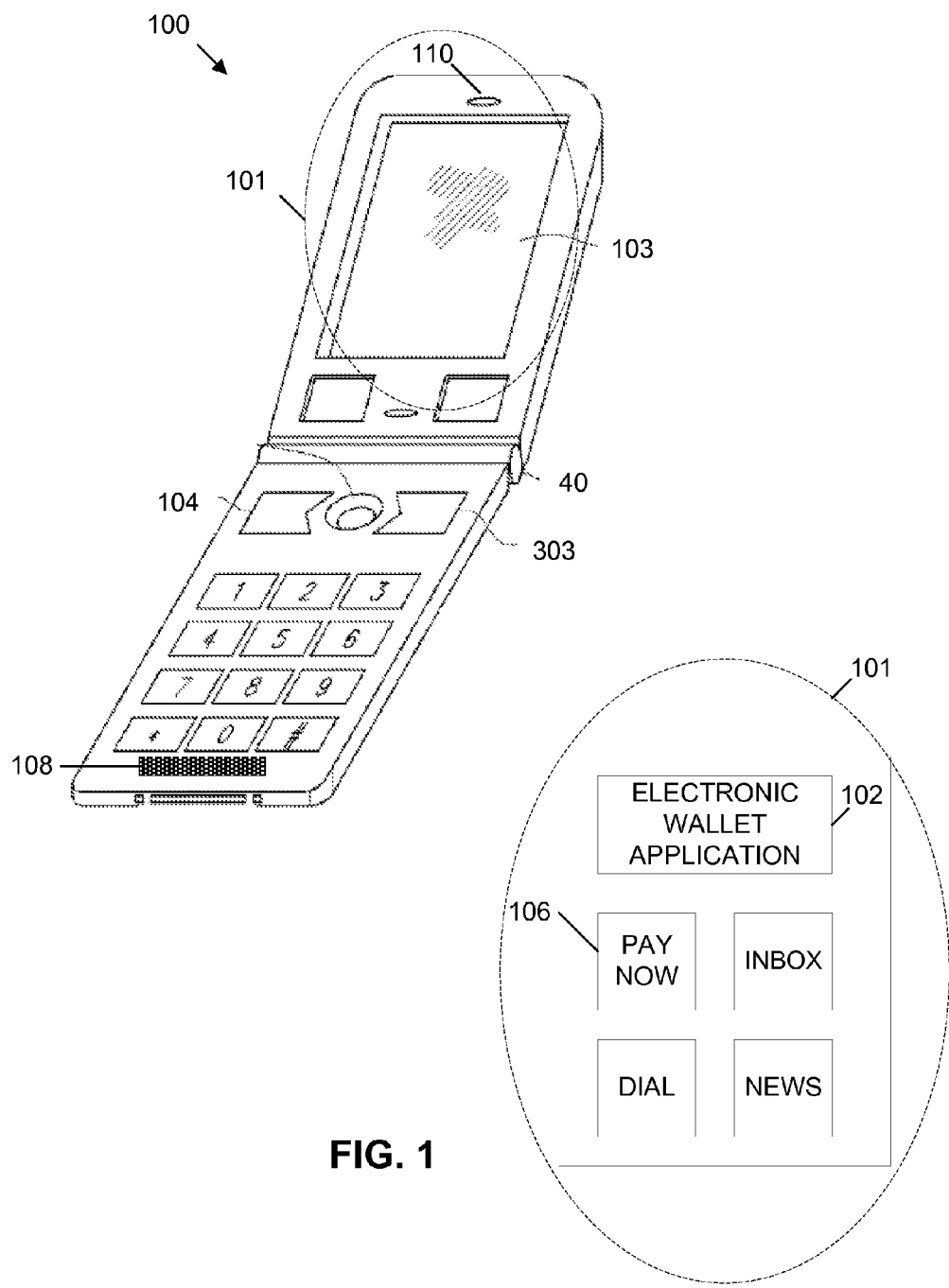
Figure 2:
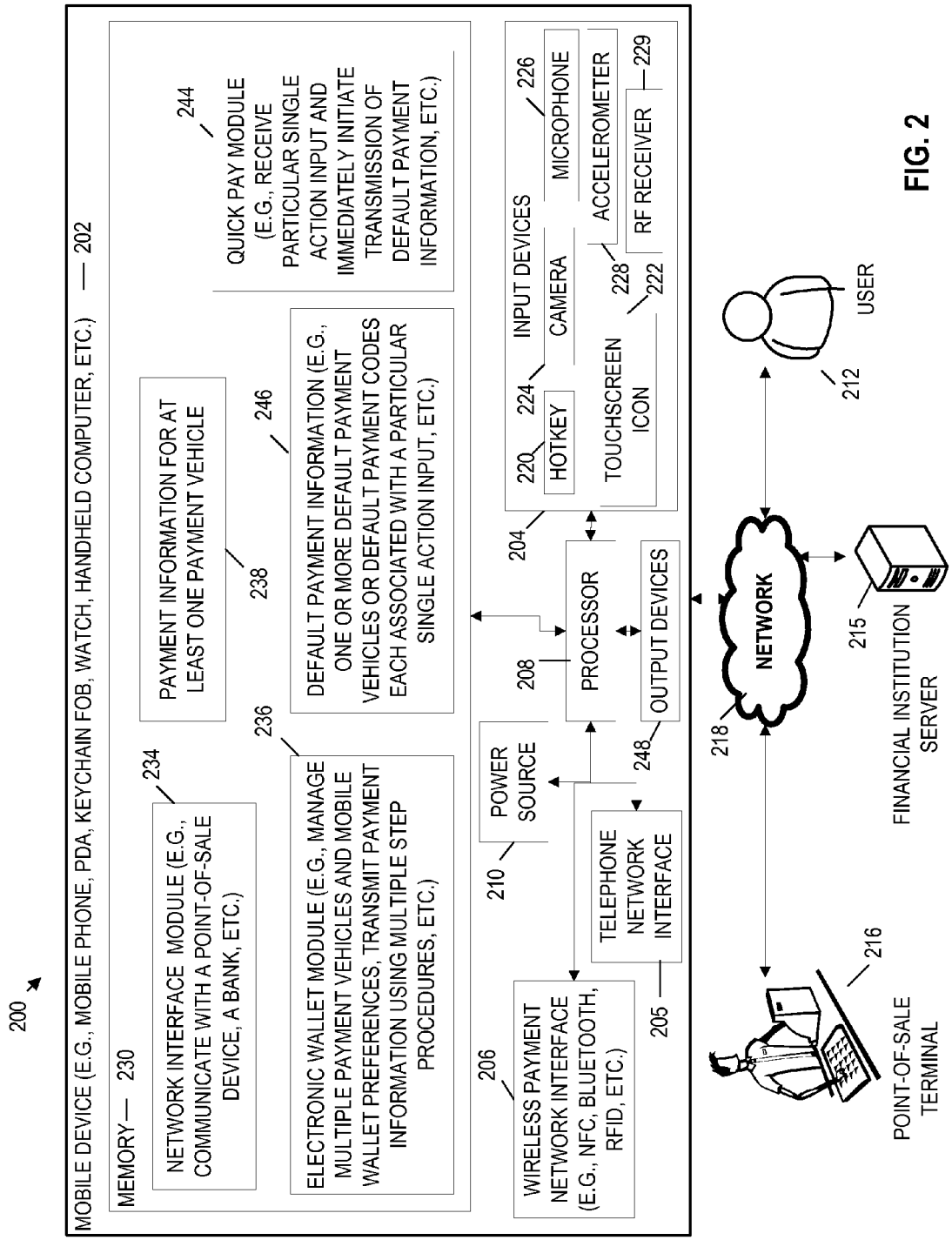
Figure 3A:
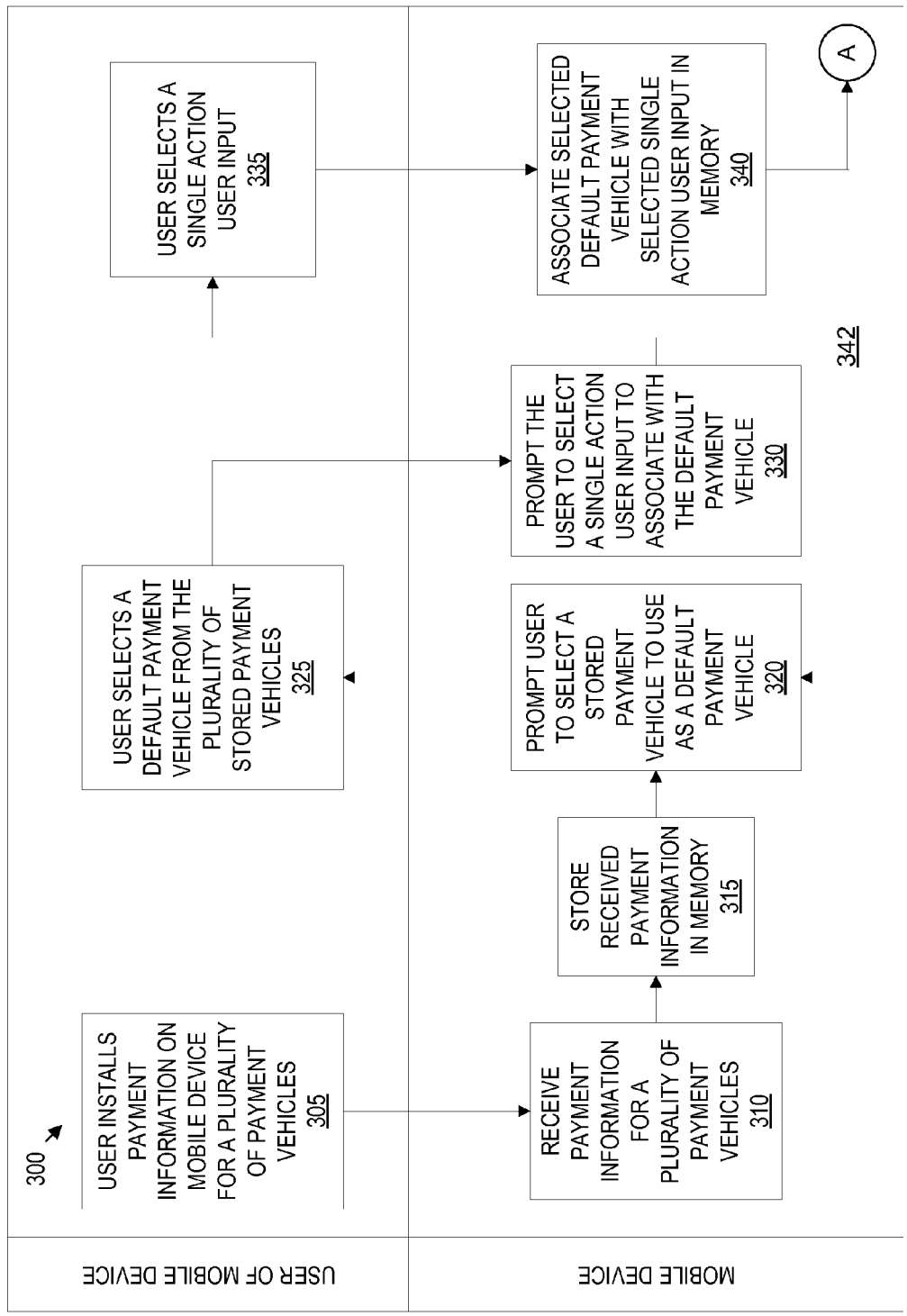
Figure 3B:
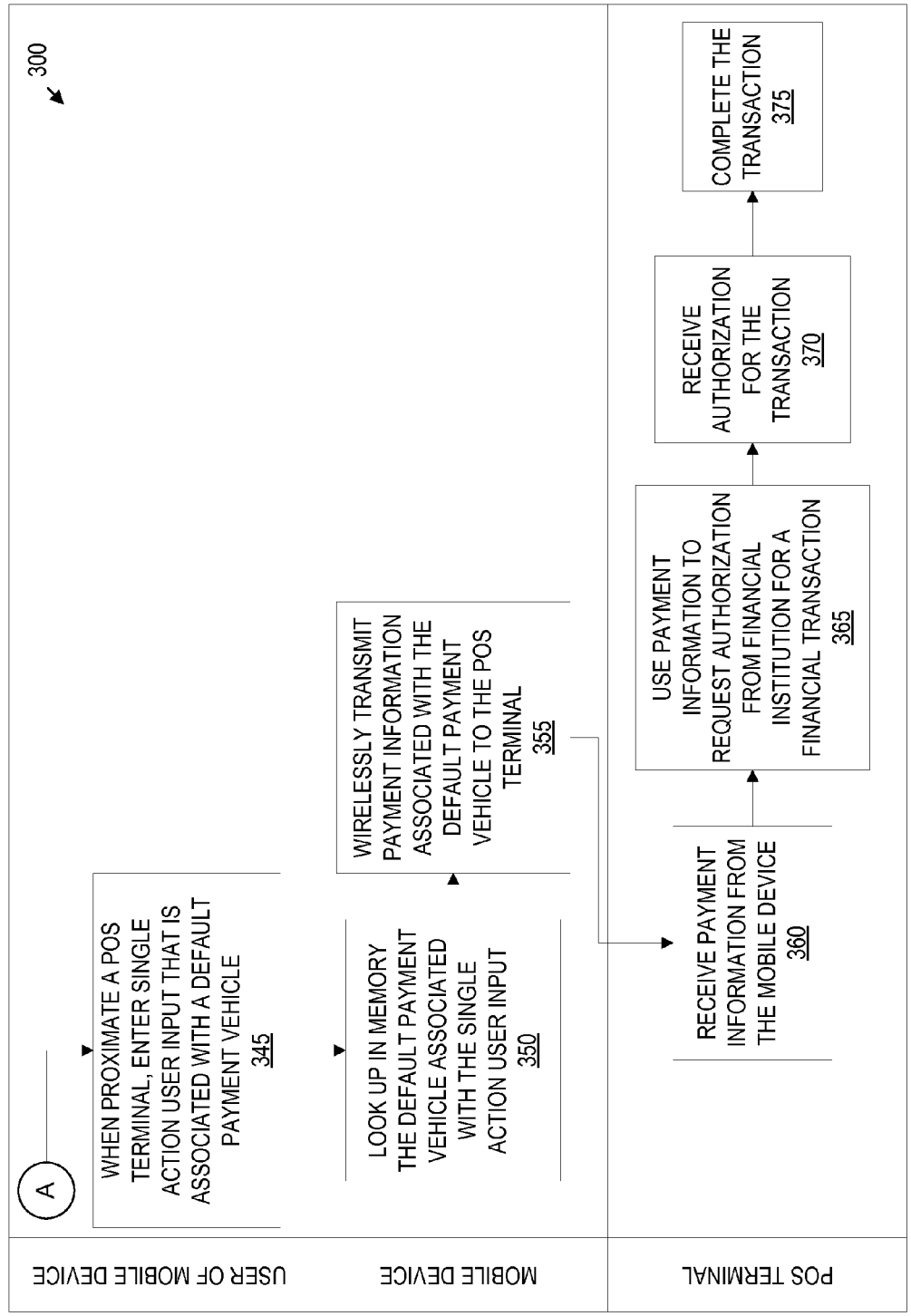
Figure 3C:
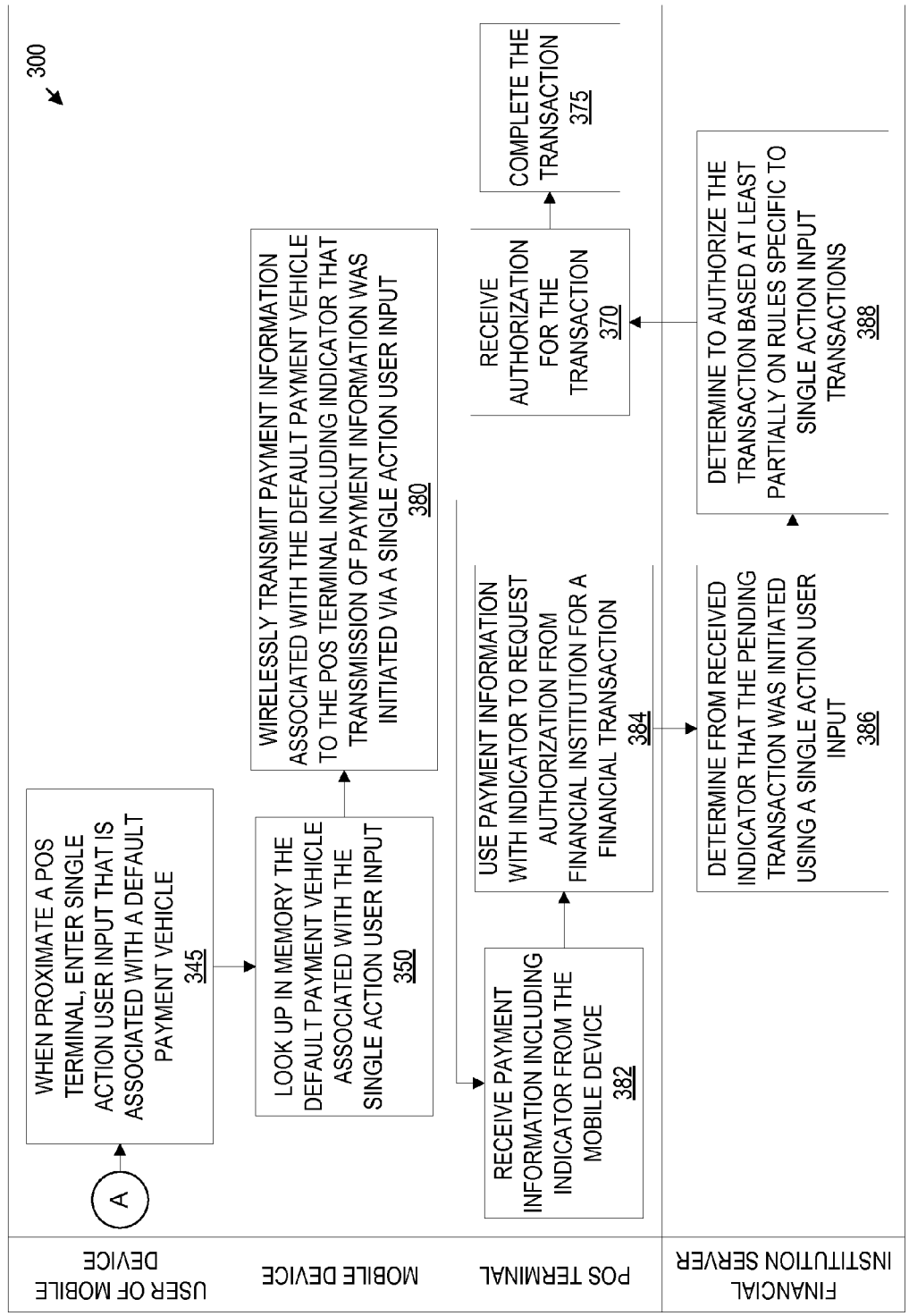
Figure 4A:
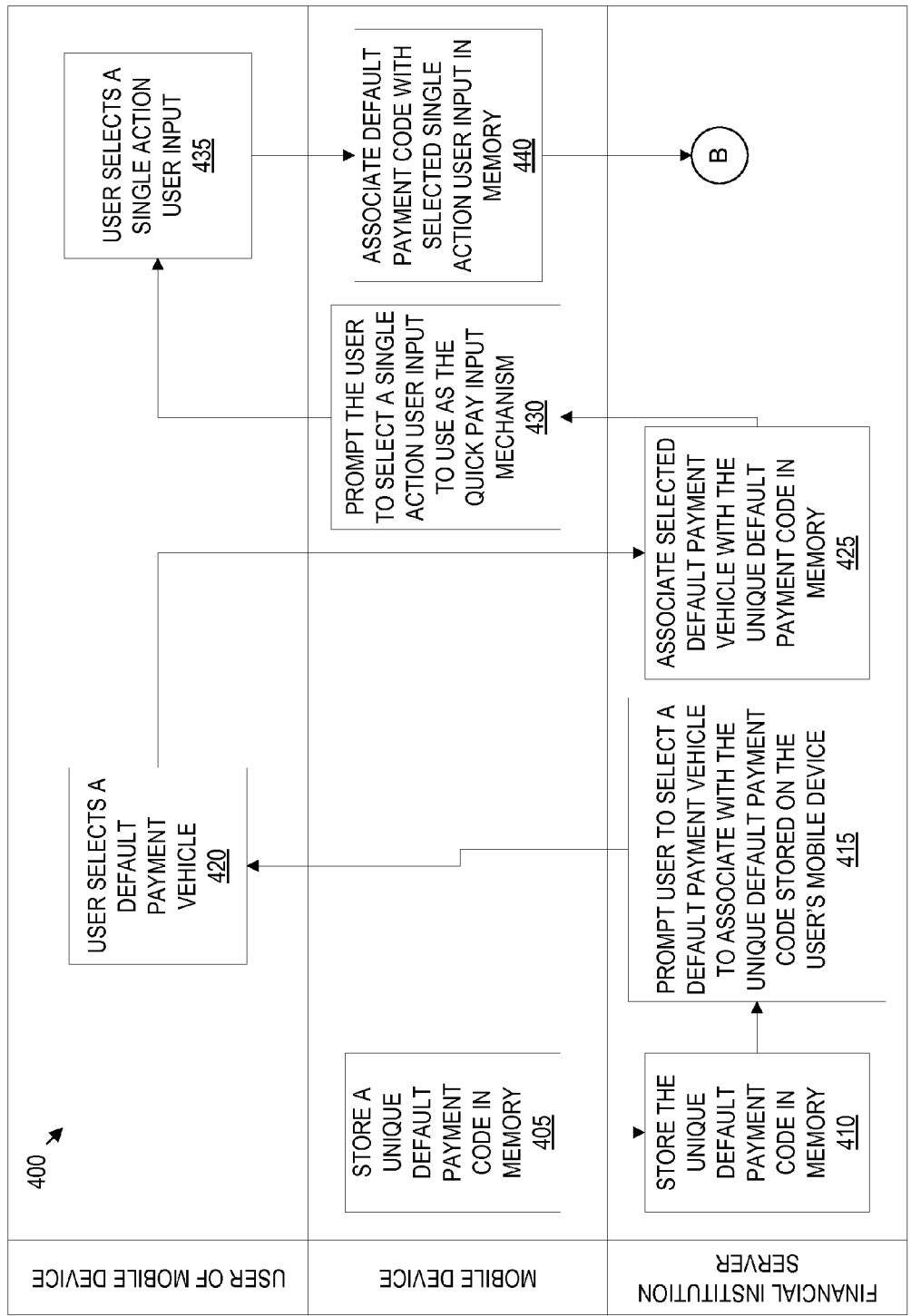
Figure 5:
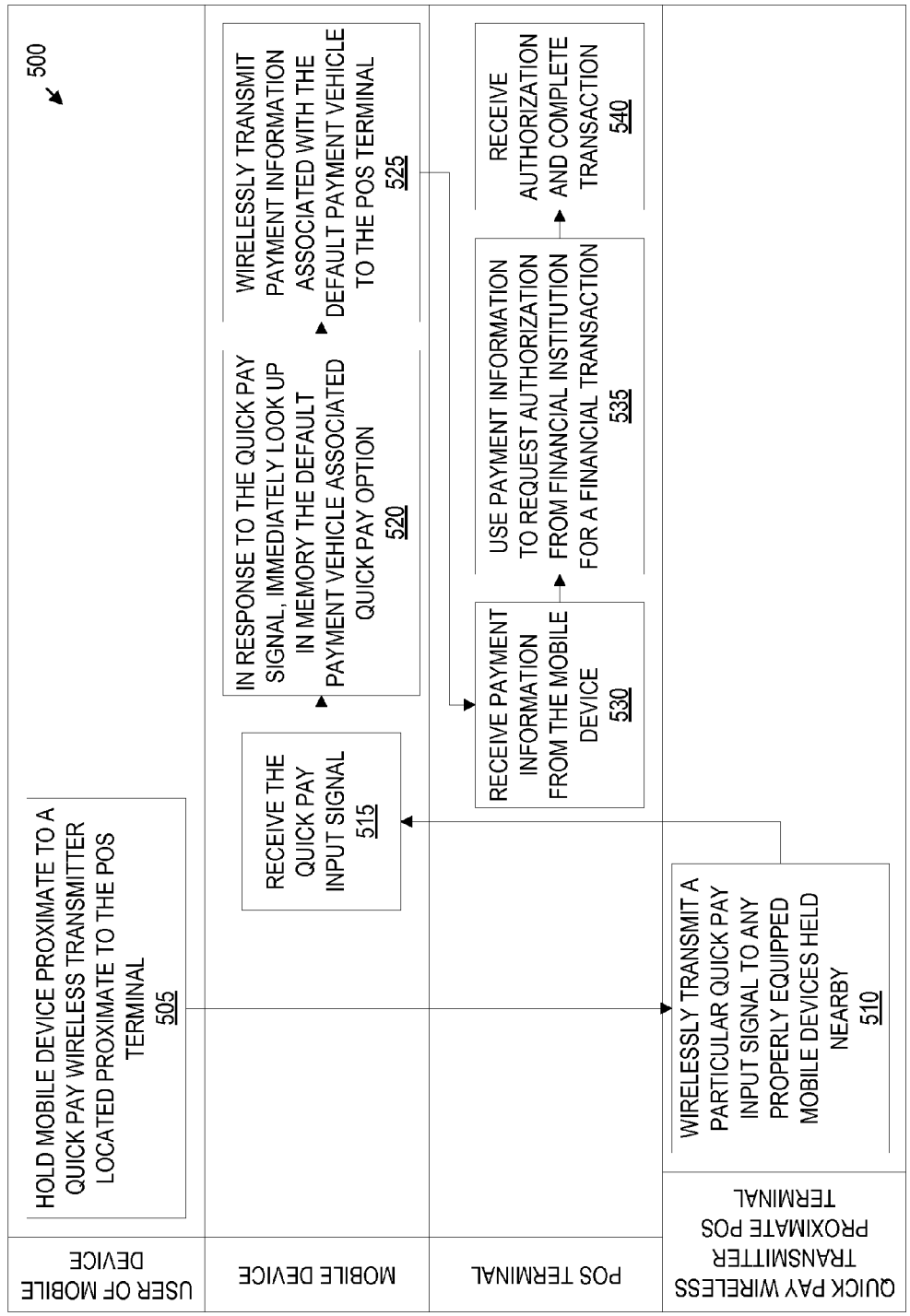
Figure 6:
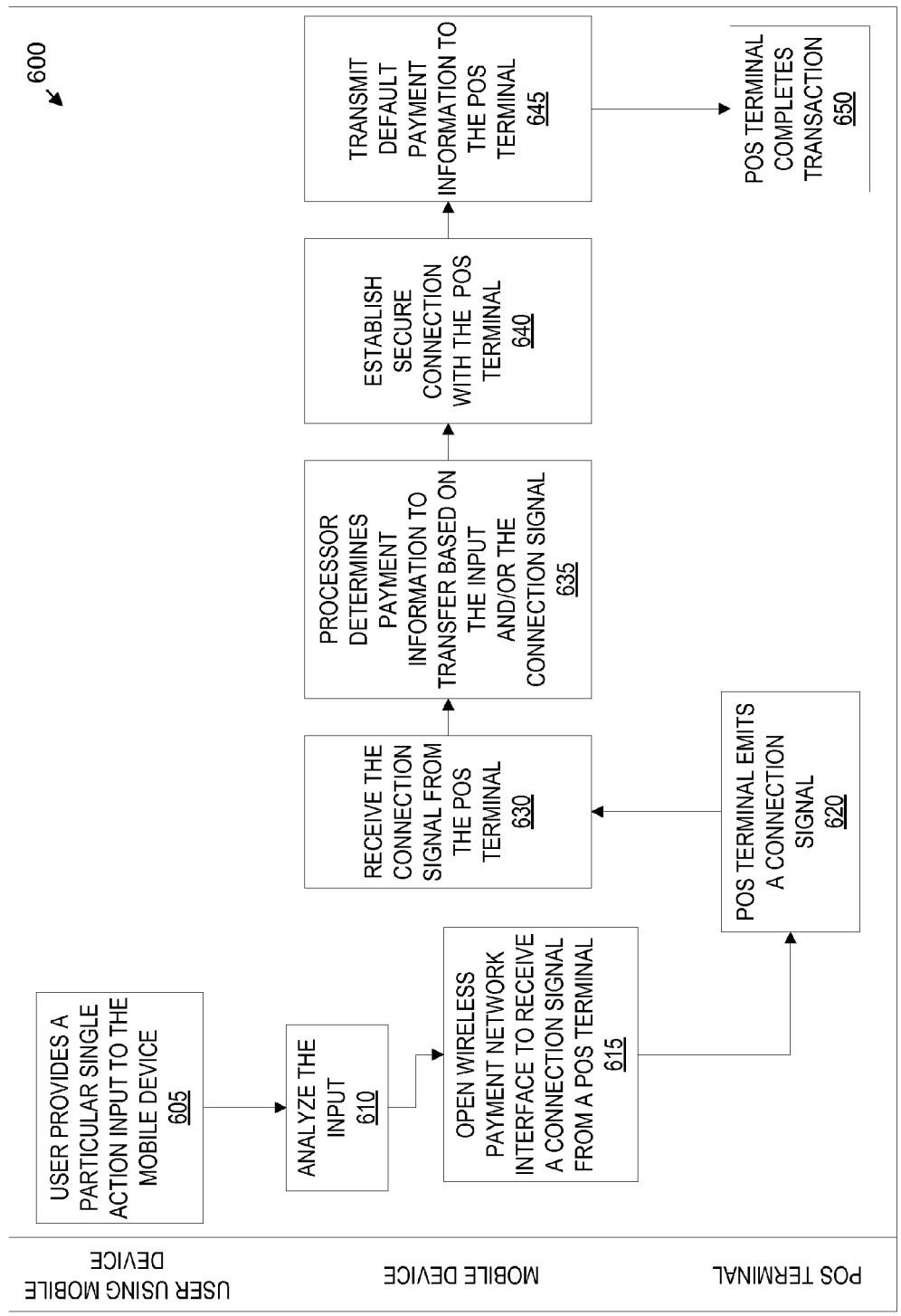
Figure 7:
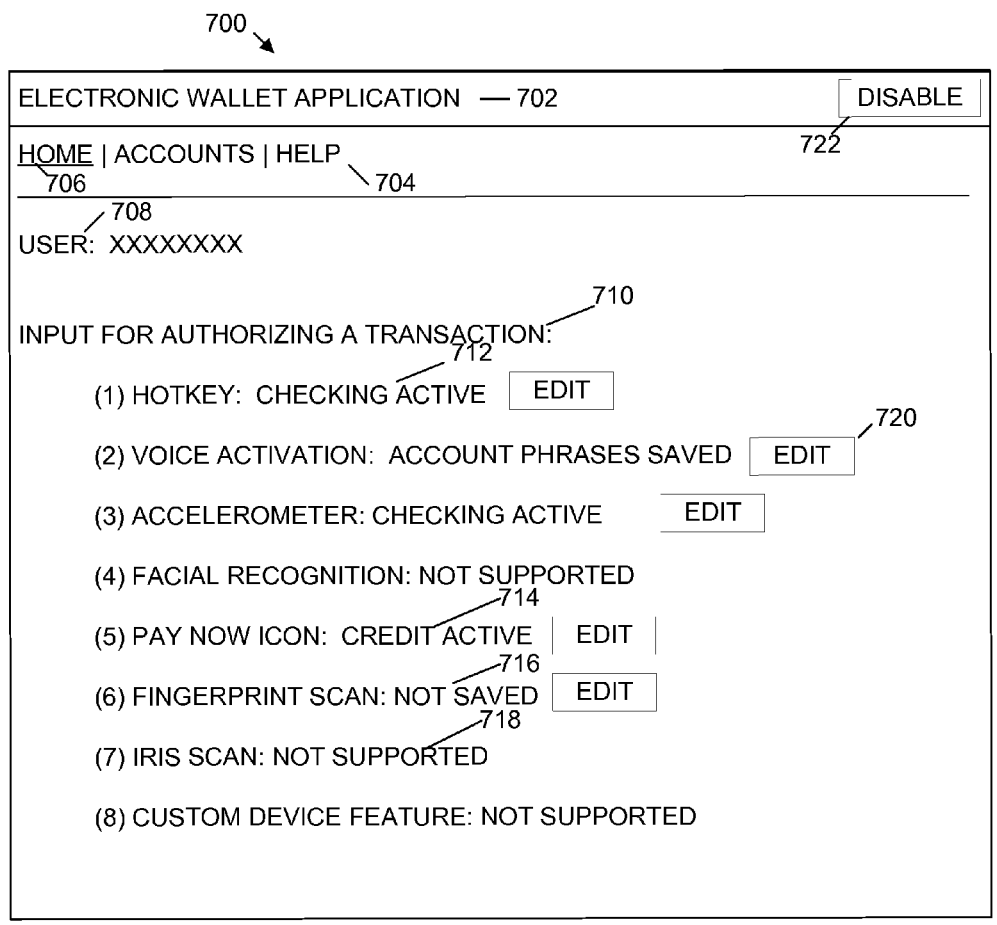
Figure 8:
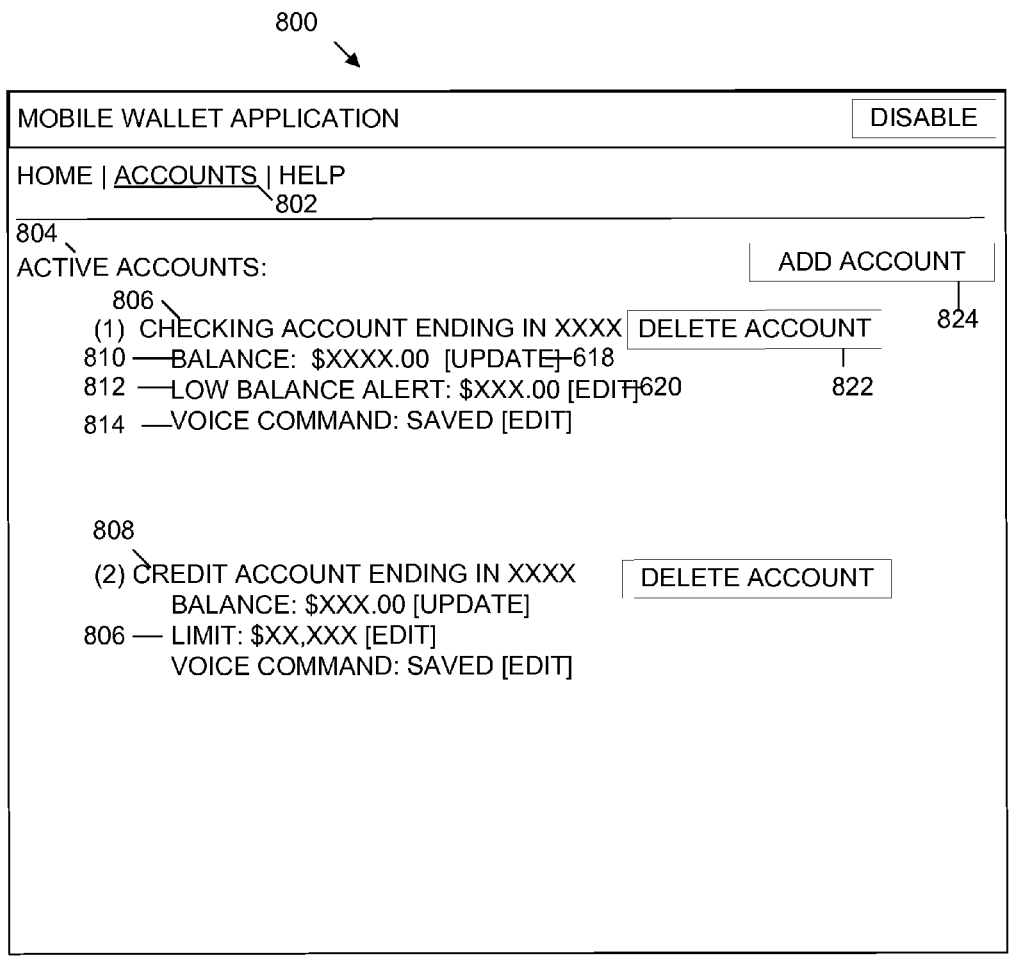

Having thus described embodiments of the invention in general terms, reference will now be made to the accompanying drawings, wherein:

FIG. 1 provides an example of a transaction authorization system for a mobile commerce device, in accordance with one embodiment of the present invention;

FIG. 2 provides a block diagram illustrating a transaction authorization system in a mobile commerce embodiment, in accordance with one embodiment of the present invention;

FIG. 3a provides a flow diagram illustrating a process for configuring a transaction authorization system, in accordance with some embodiments of the present invention;

FIG. 3b provides a flow diagram illustrating a process for using the transaction authorization system to engage in a transaction at a point-of-sale, in accordance with some embodiments of the present invention;

FIG. 3c provides a flow diagram illustrating an alternative process for using the transaction authorization system to engage in a transaction at a point-of-sale, where the financial institution is notified that a single action input was used to transmit the payment information so that the financial institution can apply particular rules that apply to such transactions;

FIG. 4a provides a flow diagram illustrating an alternative process for configuring a transaction authorization system, in accordance with some embodiments of the present invention;

FIG. 4b provides a flow diagram illustrating an alternative process for using the transaction authorization system to engage in a transaction at a point-of-sale, in accordance with some embodiments of the present invention;

FIG. 5 provides a flow diagram of a process where the single action input comprises a wireless signal received by the mobile device at the point-of-sale;

FIG. 6 provides a flow diagram illustrating an alternative process for communicating payment information to a point-of-sale terminal in response to a single action input, in accordance with some embodiments of the invention;

FIG. 7 provides an example of a graphical user interface associated with the transaction authorization system of a mobile commerce device, in accordance with one embodiment of the present invention; and FIG. 8 provides an example of a graphical user interface associated with accounts in a transaction authorization system, in accordance with one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Mobile electronic wallets (also sometimes referred to herein simply as "mobile wallets") have been proposed and created by the inventors and assignee of the present invention. A mobile electronic wallet is a mobile phone or similar device that can store information about a plurality of payment vehicles (e.g., credit cards, debit cards, gift cards, investment accounts, savings accounts, and/or the like) associated with the user and wirelessly transmit information about a selected payment vehicle to a point-of-sale terminal or other device to engage in a financial transaction using the selected payment vehicle. Mobile electronic wallets have many advantages in that they can allow a user to conveniently carry multiple payment vehicles (e.g., electronic credit cards, debit cards, gift cards, coupons, and/or the like) in a device that the user already carries with them at all times, such as a mobile phone.

The inventors of the present application have determined that the mobile wallets that have been proposed in the past are often not convenient enough for many potential users because these existing mobile wallets require a user to perform too many actions at the point-of-sale (POS) before the payment vehicle is communicated to the POS terminal. For example, before the payment information is transmitted to the POS terminal, the user is often required to: (1) find the electronic wallet application on the user's mobile phone; (2) launch the electronic wallet application; (3) perform one or more authentication procedures using the electronic wallet application; (4) select the payment vehicle from a plurality of payment vehicles stored in the electronic wallet application; (5) instruct the electronic wallet to transmit the selected payment vehicle; and (6) in some cases, confirm that the user wants to transmit the selected payment information. Users, however, are accustomed to using their physical credit or debit cards quickly, by pulling the physical card out of their wallet and swiping it through the magnetic stripe reader of the POS terminal. If the mobile electronic wallets are too inconvenient for many users or have require too many steps, mobile electronic wallets may never catch on and become widely adopted.

Recognizing this problem, the inventors of the present invention have developed apparatuses and methods wherein a mobile electronic wallet wirelessly transmits a particular selected payment vehicle in response to the user performing only a single action or supplying only a single input to the mobile device. For example, some embodiments of the invention allow a user to assign a default payment vehicle to a particular key or "pay now" icon of the mobile device so that activation of the particular key or icon, alone, causes the mobile device to wirelessly transmit information about the default payment vehicle. In some embodiments of the invention, a user using the single action option of the mobile device does not need to go through an authentication procedure before the mobile device transmits the default payment information. In some embodiments of the invention, if a user uses the single action option, the mobile device is configured to transmit the payment information without needing to first fully launch an electronic wallet application installed on the device. These embodiments of the invention, and others, are described in greater detail below with reference to the various figures.

Exemplary Embodiment of the Invention

FIG. 1 provides an example of a mobile device 100, such as a mobile phone, in accordance with one embodiment of the present invention. Callout 101 depicts a screen 103 of the mobile device 100 in greater detail. In some embodiments of the invention, the mobile device 100 includes an electronic wallet application 102, which is a software application installed on the mobile device 100 that manages the user's electronic wallet. Specifically, a user may download the electronic wallet application 102 from a server to the mobile device 100. The user may then download payment information about each of a plurality of payment vehicles from one or more servers and store this information in a secure section of memory on the mobile device 100. The user can then use the electronic wallet application 102 to manage and use the payment vehicles stored in the mobile device 100.

For example, a user at a POS terminal wishing to use the mobile wallet could enter user input by selecting the electronic wallet application 102 which would then cause the mobile device 100 to launch a full version of the electronic wallet application 102. The electronic wallet application 102 may then require the user to authenticate herself by prompting the user to, for example, enter a personal identification number (PIN) into the mobile device 100. The electronic wallet application 102 then may display to the user several payment vehicles that are stored on the mobile device 100 and that are available to the user for making a payment at the POS terminal. The user could then select one of the payment vehicles and then instruct the mobile wallet application to wirelessly transmit payment information about the selected payment vehicle to the POS terminal. Often, the electronic wallet application 102 has numerous other features that may help the user select a payment vehicle, such as balance information and other account information for each payment vehicle stored therein. The electronic wallet application 102 also typically presents user-friendly graphical user interfaces (GUIs) that illustrate, for example, images of or logos associated with each payment vehicle, as well as other helpful graphics.

As an alternative to using the full version of the electronic wallet application 102 in the manner just described, if the user approaching the POS terminal already knows that she wants to use a particular pre-selected default payment vehicle and if the user is comfortable not requiring pre-authentication prior to the mobile device 100 transmitting payment information, then the user can use the "pay now" icon 106 displayed on the screen 103 of the mobile device 100 in order to avoid all of the time and hassle of launching a full version of the electronic wallet application 102 and going through multiple steps to use the full version of the electronic wallet application 102 to select a payment vehicle and transmit the selected payment vehicle. In response to the user's selection of the "pay now" icon 106 alone (e.g., a single user action), the mobile device 100 quickly, automatically, and wirelessly transmits payment information associated with a default payment vehicle. This payment information can then be received by a wireless receiver at the POS terminal (or another transaction device, such as another mobile device in a person-to-person transaction). In some embodiments of the invention, the transaction authorization system allows the user to select a particular payment vehicle from a plurality of the user's payment vehicles and identify the selected payment vehicle as the default payment vehicle that is to be associated with the "pay now" icon 106. As is understood, the name of the icon has no bearing on the functional capabilities and the "pay now" icon may have any name.

The type of single action input used to cause the mobile device 100 to transmit the default payment information may be any type of input that the mobile device is capable of receiving. In this regard, single action inputs other than a quick pay icon described above may be used to initiate the "quick pay" option of the mobile device 100. The single action input may be tactile, visual, audible, or wireless. In some embodiments, the single action input is standardized, such as a dedicated key on the mobile device or a "pay now" icon displayed on the main desktop of the mobile device 100. In other embodiments, the input is personalized for the user, such as a user-selected hotkey 104 or other configurable button, a user-selected combination of buttons that the user must enter simultaneously, a user-selected word or phrase spoken through the microphone 108, and/or the like. In embodiments of the invention where the user can assign the quick pay function to a non-obvious single action input, the transaction authorization system provides both convenience and security because the user can easily authorize the transaction by providing the single action input, but another person using the mobile device 100 may not be able to easily figure out the single action input needed to use the quick pay feature of the mobile wallet.

As discussed, an exemplary embodiment of the single action input device is a hotkey 104 on the mobile device 100. In some embodiments of the invention, the hotkey 104 is a dedicated button on the mobile device 100. For example, a cell phone can be sold with a specialized button on the side of the phone that, when pressed, causes the phone to wirelessly transmit default payment information using a wireless protocol capable of being received by a transaction device (e.g., a POS terminal, other mobile device, automated teller machine, etc.).

In other embodiments of the invention, the hotkey 104 is a generic button on the mobile device 100 that can be customized by the user and assigned a function. For example, the user may indicate that a general purpose button on the mobile device 100 functions as a single action input for purposes of wirelessly transmitting payment information. In another example, the user indicates that the combination of the number "1" on the cell phone keypad and the "#" button pressed simultaneously is the single action input that the user can use to quickly transmit default payment information without requiring certain other intervening steps between entering the input and wireless transmission of the payment information. By providing flexibility in the design of the hotkey, the electronic wallet application 102 may be incorporated into many different form factors and not only mobile phones.

In some embodiments, the transaction authorization system includes more than one icon 106 for quickly authorizing payment through a single user action. For example, each of a plurality of icons may authorize payment from each of a plurality of different payment vehicles associated with the icons in the memory of the mobile device 100. By having a simplified icon for authorizing payment, the user is able to quickly select a single icon rather than having to navigate through a series of screens on the full version of an electronic wallet application.

In still other embodiments of the invention, the input device is a microphone 108 coupled to the mobile device 100 and configured to receive verbal input from the user. In an exemplary embodiment, the microphone 108 used for the transaction authorization system is the same receiver that is used to capture the user's voice for use with the cell phone. For example, the user may speak into the phone to authorize a transaction just as the user would speak into the phone to converse with someone on a phone call. In one embodiment, the transaction authorization system is configured to authorize the transaction if the user says a specific user-defined word or phrase. For example, the transaction authorization system may receive the input from the microphone, analyze the input to determine whether the user is qualified to authorize the transaction based on voice recognition software, and/or determine the financial account to transfer based on speech recognition software.

For example, a user may create a quick pay voice command for the user's credit card with Bank A and debit card with Bank B by using the electronic wallet application and then assign payment information to each command using the same application. For instance, the user may create a voice command "Bank A credit card" to use for instructing the mobile device 100 to instantly send the payment information for his credit card with Bank A, and a voice command "Bank B debit card" to use for instructing the mobile device 100 to instantly send the payment information for his debit card with Bank B. Once the commands are created, the user may be able to initiate a payment at a POS terminal by simply saying "Bank A credit card" or "Bank B debit card" depending on the card the user desires to use.

Other embodiments may use biometrics both as the single action input and for use in authentication of the user at the same time. For example, in one embodiment of the invention the user presses a "pay now" icon on the touch screen of their mobile phone with the user's finger and the touch screen immediately scans the fingerprint of the finger pressing the icon and then immediately initiates transmission of the payment information if the fingerprint matches one stored in the phone's memory for the user. In other embodiments of the system, the input device is a camera 110 coupled to the mobile device 100. For example, the input device may be a still camera or a video camera, such as on a cell phone. In some embodiments, the camera 110 provides an image of the user to the transaction authorization system that triggers the transaction authorization system to complete the transaction. For example, facial recognition software may determine that the user is the user logged into the transaction authorization system and confirm that the user's financial account information should be transferred.

In a still further embodiment, the input device is an accelerometer. While not shown in FIG. 1, the accelerometer can be internal to the mobile device 100 and used to determine acceleration of the mobile commerce device. In an embodiment, the single action input used to trigger transmission of the default payment information is the user moving, or accelerating, the mobile device 100 in a particular way, perhaps simultaneously in combination with the user depressing a button on the mobile device 100. For example, the user may be able to authorize payment by simply pushing a button on the side of the user's phone and simultaneously tapping the phone against the near-field-communication (NFC) receiver of the POS terminal. The input received by the transaction authorization system is that the mobile commerce device has reached some minimum level of acceleration/deceleration, indicating a motion that would not occur in normal use of the mobile device. For example, the provider of the transaction authorization system may determine the level of acceleration that activates the payment. The speed with which the user typically moves the phone, such as when bringing the phone up to speak into, is insufficient to trigger the transaction authorization system, but flicking or moving the phone quickly towards the point-of-sale device would trigger automatic payment.

In another embodiment of the invention, the input comprises a wireless signal received by the mobile device 100 from a wireless transmitter, such as a radio-frequency (RF) or NFC transmitter located proximate to the POS terminal or other transaction device. In such an embodiment, the single user action would be moving the mobile phone within range of the transmitter. For example, the user may select a payment vehicle for the phone to use as a default. Many POS terminals, ATMs, and other transaction devices may be equipped with quick pay RF transmitters that transmit a standard RF signal that can be received by properly equipped mobile devices 100 and interpreted by the mobile device 100 as a command to transmit the user's default payment information. If the user desires to use her default payment vehicle, the user simply has to hold the mobile device 100 within range of the transmitter (which may be a very short range) and hold the mobile device 100 within range of the transaction devices NFC receiver. The single action of holding the mobile device 100 within the range of the transmitter will cause the mobile device 100 to automatically begin wirelessly transmitting information for the default payment vehicle, and then the user simply has to move the mobile device 100 within range of the transaction device wireless payment information receiver.

In some embodiments of the invention, the single action input used for the quick pay option causes the mobile device 100 to transmit the default payment information without requiring authentication. In other embodiments, the single action input used for the quick pay option causes the mobile device 100 to transmit the default payment information without requiring authentication before the transmission, but authentication may be required afterwards. In still other embodiments, the single action input used for the quick pay option causes the mobile device 100 to transmit the default payment information without requiring authentication in only certain transactions, such as transactions below a certain value or certain types of transaction.

In this regard, the quick pay option could be limited by quick-pay-specific rules created by the user, the financial institution associated with the default payment vehicle, and/or the merchant or other party involved in the transaction, especially in embodiments where the quick pay option does not require additional authentication of the user prior to completing the transaction. For example, the user may indicate that transactions involving transaction amounts less than $20 can be authorized by triggering a hotkey, alone, on the mobile device. Further details regarding such rules and use thereof are described in greater detail below.

The exemplary embodiment of FIG. 1 illustrates general principles and embodiments of the system and method of providing a transaction authorization system. Further, as should be understood, the transaction authorization system may include any number of the input devices disclosed herein. Incorporation of one input device does not foreclose the use of another input device with the transaction authorization system. The examples included above and others will be discussed in greater detail herein below with reference to FIGS. 2-8.

Transaction System Overview

FIG. 2 provides a block diagram illustrating a transaction authorization system 200 in a mobile commerce environment, in accordance with one embodiment of the present invention. In some embodiments, the transaction authorization system 200 includes a mobile device 202 such as a mobile phone, PDA, handheld computer, etc. The mobile device 202 typically includes one or more input devices 204, a telephone network interface 205, a wireless payment network interface 206, a power source 210, one or more output devices 248, a memory 230, and a processor 208. The system 200 also generally includes a user 212, a financial institution server 214, and a POS Terminal 216 (which may be any other transaction device including, for example, an ATM, another mobile device, and/or the like) communicably coupled via a network 218.

As previously discussed, the input device 204 includes many different embodiments. For example, the input device may be a hotkey 220 (or any other key or combination of keys), a touch screen icon 222, a camera 224, a microphone 226, an accelerometer 228, a RF receiver 229 (or any other wireless signal receiver), and/or the like. In other embodiments, the system includes a scanner (not shown) or other input device. Any or all of the input devices may be included as part of the system. For example, a cell phone may have a hotkey, a touch screen icon, a camera, a microphone, and an accelerometer. Any one of the single action input devices may trigger the mobile device 202 to use the wireless payment network interface 206 to wirelessly transmit pre-selected payment information.

The wireless payment network interface 206 is a wireless transmitter or transceiver configured to communicate with a properly equipped POS terminal, ATM, or other transaction device via one or more wireless information protocols, such as NFC, Bluetooth, WIFI, or other RF protocols. As such, the wireless payment network interface 206 generally includes an antenna.

The telephone network interface 205 is a transmitter or transceiver configured to communicate over standard telephone networks. For example, the telephone network interface 205 can transfer data over 3G or 4G wireless networks. The telephone network interface 205 is included in the mobile device 202 for use as a mobile phone.

The network 218 may be a global area network (GAN), such as the Internet, a wide area network (WAN), a local area network (LAN), a WIFI network, a 3G network, or any other type of network or combination of networks. The network 218 may provide for wireline, wireless, or a combination of wireline and wireless communication between devices on the network. The network 218 illustrated includes several networks including a mobile telephone network, a local wireless payment network, a global payment transaction network, and perhaps the internet.

As used herein, the term "processor" generally includes circuitry used for implementing the communication and/or logic functions of a particular system. For example, the processor 208 may include one or more digital signal processor devices, microprocessor devices, and various analog-to-digital converters, digital-to-analog converters, and other support circuits and/or combinations of the foregoing. Control and signal processing functions of the system are allocated between these processing devices according to their respective capabilities. The processor 208 may include functionality to operate one or more software programs based on computer-readable instructions thereof, which may be stored in the memory 230.

The processor 208 is operatively coupled to the wireless payment network interface 206 and the input device 204. The processor 208 uses the wireless payment network interface 206 to establish connections with servers, computers, and mobile devices. Additionally the processor 208 uses the wireless payment network interface 206 to communicate with the network 218 and other devices on the network 218, such as, but not limited to, the POS terminal 216 and the financial institution server 215 via the POS terminal. The processor 208 may also be configured to communicate with the financial institution server 215 via the Internet, the telephone network, or a combination thereof.

In some embodiments, the transaction authorization system includes computer-readable instructions stored in the memory 230, which generally includes the computer-readable instructions of: (1) a network interface module 234 configured to allow the mobile device 202 to interact with the network 218; (2) an electronic wallet module 236, which manages the user's electronic payment vehicles and other virtual wallet functions; and (3) a "quick pay" module 244, which manages the single action payment transmission system and procedures of the invention described herein, and which may or may not be a sub-portion of the electronic wallet module 236. In some embodiments, the memory 230 also includes payment information for at least one payment vehicle 238 and/or default payment information 246.

The network interface module 234 operates the wireless payment network interface 206 to communicate payment information with other transaction devices on the network 218. In an embodiment, the network interface module 234 communicates with servers, computers, other mobile devices, and point-of-sale devices. For example, the network interface module 234 may configure the wireless payment network interface 206 to communicate with the POS terminal 216 over the network 218.

The electronic wallet module 236 manages multiple payment vehicles and mobile wallet preferences. In some embodiments, the electronic wallet module 236 transmits payment information using multiple step procedures. In the context of the transaction authorization system, however, the electronic wallet module 236 may not be engaged at all or only minimally engaged in the transaction authorization process.

In some embodiments, the quick pay module 244 receives a particular single action input and immediately initiates transmission of the default payment information. In an embodiment, the quick pay module 244 receives an input from the input device 204 and transfers payment information to the POS terminal 216 using the network interface module 234 and the wireless payment network interface 206. For example, a user may trigger a hotkey 220 and the quick pay module 244 may automatically and immediately initiate transmission of the payment information using the wireless payment network interface 206.

In an embodiment, the payment information for at least one payment vehicle 238 is stored in the memory 230. The payment vehicle may be a credit card, debit card, gift card, rewards account, investment account, savings account, checking account, and/or the like. In an embodiment, the payment information for the payment vehicle is the information necessary to authorize a transaction from the payment vehicle. For example, the payment information for a credit card may be the card number and expiration date. In another embodiment, the payment information for the payment vehicle is a unique identifier associated with the mobile device, wherein the unique identifier is linked to a payment vehicle on a server. In a still further embodiment, a plurality of payment vehicles with associated payment information is stored in the memory. For example, a user may store both a credit card and a rewards account in the memory of the mobile device.

In some embodiments, the default payment information 246 is stored in the memory 230. In an embodiment, the default payment information 246 is the payment information associated with a particular single action input. For example, the default payment information for triggering a hotkey may be the payment information associated with the user's credit card. In some embodiments, one or more default payment vehicles or default payment codes are associated with particular single action inputs. For example, a gift card code may be associated with a touchscreen icon on the mobile device such that when the icon is pressed, the gift card is automatically debited the amount of the transaction. In a still further embodiment, the default payment information is stored on a server and accessed when the POS terminal 216 transmits a unique code associated with the mobile device to the financial institution server 215.

In an embodiment not shown, the memory 230 includes a security module configured to maintain the security of the user's payment information on the mobile device and during the transaction. The security module contains data encryption software for protecting the payment information in the memory of the mobile device. A wide variety of encryption techniques are available for protecting data on a mobile device. Inclusion of the user's account number and other financial information in the mobile device indicates the desirability of having effective encryption techniques available. In another embodiment, the security module establishes a secure connection with the point-of-sale device. A secure connection is a connection that an unauthorized third party is unable to gain access to. In some embodiments, the secure connection is established solely by the mobile device. In other embodiments, the secure connection is established by the mobile device in cooperation with the point-of-sale device. In a still further embodiment, the security module controls security related to the input devices 204 as well. For example, the security module may encrypt the user's personal input data, such as facial scans and voice scans, so that third parties may not copy or view this information. In addition, in some embodiments, the security module evaluates the number of times the user has unsuccessfully attempted to authorize the transaction and locks the user out after a certain number of failed attempts. For example, the user may attempt to authorize a transaction using facial scanning input from the camera. If the incorrect user is attempting to do so, the facial scanning software will not recognize the user's face and hence not authorize the transaction. The security module can recognize this failure and if it happens a predetermined number of times, such as three times, the security module can lock the transaction authorization system down for security purposes. In other embodiments, instead of locking the mobile device down, the security module requires enhanced authentication procedures such as entry of a username and password.

In some embodiments, the power source 210 is a battery, such as a battery coupled to the mobile device. In other embodiments, the power source 210 is a receiver for receiving power from a remote source. For example, the power source may be receiver that receives power from a POS terminal via passive RF technology.

The transaction authorization system 200 is depicted in a mobile commerce environment including the user 212 of the mobile device 202, one or more financial institution servers 215, and one or more POS terminals 216. In some embodiments, the user 212 is a customer of a financial institution. For example, the user 212 may be a customer of a bank and link the user's bank accounts (which may be accessible via the financial institution server 215) to the user's mobile device 202. In another embodiment, the user 212 is not a customer of a financial institution. In some embodiments, the user 212 utilizes a personal account with the transaction authorization system, such as rewards points, prepaid accounts, or other personal accounts.

The POS terminal 216 may be a computer system at a merchant or other point of sale that handles the financial transaction during a sale, return, or other transaction. In other embodiments, the POS terminal 216 may be replaced with any other transaction device, such as an ATM or another mobile device. For example, the transaction authorization system may authorize transfers of funds from one user to another user rather than between the user and a merchant. Individuals wanting to gift money to a person, loan money to a person, or pay off a personal debt would find the ability to quickly and easily transfer money between mobile devices advantageous.

In some embodiments, the user interacts with the financial institution server 215. The financial institution server 215 is a computer system associated with a bank, credit union, or other provider of financial services. The financial institution server 215 contains information relating to the user's financial accounts (or other payment vehicles), such as the user's account number, the account balance, transactions, and credit maximums. The financial institution server 215 may be accessed in order to download payment information and account information to the mobile device 202, to establish default payment vehicles, to create single-action transaction rules, and to request authorization for a transaction, as described in greater detail below.

In some embodiments, the POS terminal 216 is configured to complete the transaction using a standard global payment network and transaction processing system. For example, once the user's payment information is transferred to the POS terminal 216, the POS terminal 216 completes the transaction in a similar manner to current credit card and debit card transactions. The POS terminal 216 communicates with the financial institution server 215 to determine whether sufficient funds are available to complete the transaction.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3a through FIG. 6, described below, illustrate process flows for methods of using the transaction authorization system described above in different ways to configure the system and effectuate single-action payment information transmissions during a transaction, in accordance with various embodiments of the invention. It should be understood that the steps performed by each entity may, in some cases, be performed in a different order than the order shown, may be performed by different entities, or may not be performed at all. These figures depict only some embodiments of the invention but do not limit the invention to the described steps.

Configuration of Single-Action Payment Transmission System

FIG. 3a provides a flow diagram illustrating a process 300 for configuring a transaction authorization system, in accordance with some embodiments of the present invention. As illustrated by block 305, the user of the mobile device installs payment information on the mobile device for a plurality of payment vehicles. For example, the user may first install an electronic wallet application on the mobile device to help the user manage an electronic wallet on the user's mobile phone. The user may then be able to use the electronic wallet application to access, via the network, servers for each of a plurality of financial institutions in order to download payment information, e.g., encrypted account numbers, etc., associated with the one or more payment vehicles issued to the user from the financial institution. For example, a user may use her mobile phone to access Bank A and download the information needed to be able to make wireless mobile wallet payments from her checking account with Bank A.

As illustrated by block 310, the mobile device receives payment information for a plurality of payment vehicles. In an embodiment, the mobile device receives the payment information from the user using an input device or from the financial institution server by means of the network interface module. For example, the user may enter the payment information into the mobile device using the touchscreen or the mobile device may receive the payment information wirelessly over a network from the user's bank. In some embodiments, the user selects the payment information to transfer to the mobile device using the Internet.

As illustrated by block 315, the mobile device stores the received payment information in memory. In an embodiment, the received payment information is stored for a plurality of payment vehicles in the memory of the mobile device. For example, payment information for a credit card and for a checking account may be stored in the memory of a mobile phone.

As illustrated by block 320, the mobile device prompts the user to select a stored payment vehicle to use as a default payment vehicle. In an embodiment, an output device, such as a screen or speaker, requests that the user select a payment vehicle for use when the transaction authorization system is automatically and immediately authorizing payment. For example, a message may appear on the screen of a mobile phone requesting that the user select one of the three payment devices stored on the phone for use a default payment option.

As illustrated by block 325, the user selects a default payment vehicle from the plurality of stored payment vehicles. In an embodiment, the user selects the default payment vehicle by using an input device to indicate her choice. For example, the user may select an account displayed on the touchscreen to indicate which payment vehicle should be used as the default payment vehicle.

As illustrated by block 330, the mobile device prompts the user to select a single action user input to associate with the default payment vehicle. In an embodiment, the mobile device prompts the user the select one of the potential input devices for association with the default payment vehicle. For example, a message can appear on the screen requesting that the user select the hotkey, combination of hotkeys, application, or verbal command that will be associated with the default payment vehicle.

As illustrated by block 335, the user selects a single action user input. In an embodiment, the user selects the single action user input from a list of single action user inputs displayed on the mobile device screen. In another embodiment, the user selects the single action user input by performing the single action. For example, the user may depress the hotkey to indicate that the hotkey is the single action user input that is to be associated with the default payment vehicle. It should be understood that the steps performed in blocks 330 and 335 may be performed prior to the steps performed in blocks 320 and 325, or concurrently with, or in any order wherein a single action user input can be associated with a stored payment vehicle.

As illustrated by block 340, the mobile device associates the selected default payment vehicle with the selected single action user input in memory. In an embodiment, the process evaluates the user's selection of the default payment vehicle and of the single action user input and stores the association in the memory. For example, the user may have selected a credit card as the default payment vehicle and a touchscreen icon as the single action user input to be associated with the credit card. The mobile device, thus, will store the association between the credit card and the touchscreen icon in the memory as default payment information. It should be understood that the process of selecting default payment vehicles and associated single action user inputs can be repeated for a plurality of payment vehicles and user inputs, as indicated by arrow 342. For example, a user may select a credit card as a default payment vehicle for a first touchscreen icon, a checking account as a default payment vehicle for a second touchscreen icon, and a rewards account as a default payment vehicle for a hotkey.

Single-Action Payment Transmission Process

FIG. 3b provides a flow diagram illustrating a continuation of process 300 where the configured transaction authorization system is now used to engage in a transaction at a point-of-sale, in accordance with some embodiments of the present invention.

As illustrated by block 345, the user enters a single action user input that is associated with a default payment vehicle when the user is proximate to a POS terminal. In some embodiments, the user enters the single action user input using the input devices, such as a hotkey, camera, or accelerometer. For example, the user may trigger a hotkey associated with a credit card when the user is attempting to complete a transaction at a cash register. In an embodiment, proximate is a relative term that is affected by the strength of the wireless payment network interface and the receiver at the POS terminal.

As illustrated by block 350, the mobile device looks up the default payment vehicle associated with the single action user input in the memory. In an embodiment, the processor determines what the single action user input consists of and reviews the default payment information in the memory to determine the default payment vehicle associated with the single action user input. For example, the mobile device may detect that a touchscreen icon was selected and determine that the touchscreen icon is associated with a credit card by reviewing the default payment information stored in the mobile device's memory.

As illustrated by block 355, the mobile device wirelessly transmits the payment information associated with the default payment vehicle to the POS terminal. In an embodiment, the wireless payment network interface is controlled by the network interface module to transmit the payment information associated with the single action user input over the network to the POS terminal. For example, a transceiver in a mobile phone may wirelessly transmit the user's credit card information to a cash register in response to the user selecting a hotkey associated with the credit card.

As illustrated by block 360, the POS terminal receives the payment information from the mobile device. In an embodiment, the POS terminal receives the payment information using an antenna. In a still further embodiment, the POS terminal decrypts the payment information after receiving it. For example, the POS terminal may receive the user's credit card information as it is being wirelessly transmitted from the mobile device.

As illustrated by block 365, the POS terminal uses the payment information to request authorization from the financial institution for a financial transaction. In an embodiment, the POS terminal sends the payment information to a financial institution and request whether the payment vehicle has sufficient funds or meets certain criteria based on the requested transaction. For example, the POS terminal may send the payment information to the bank to request whether there are sufficient funds in the user's checking account to the cover the amount of the user's purchase.

As illustrated by block 370, the POS terminal receives authorization for the transaction. In an embodiment, the POS terminal receives authorization from the financial institution associated with the payment vehicle. For example, the credit card company associated with the credit card that is being used may indicate to the POS terminal that the user has sufficient funds available to make the purchase.

As illustrated by block 375, the POS terminal completes the transaction. In an embodiment, the POS terminal recognizes that authorization was received, debits the user's account, and initiates transfer of the user's funds to an account associated with the POS terminal.

FIG. 3c provides a flow diagram illustrating an alternative process for using the transaction authorization system to engage in a transaction at a point-of-sale, where the financial institution is notified that a single action input was used to transmit the payment information so that the financial institution can apply particular rules that apply to such transactions.

As illustrated by block 345, the user enters a single action user input that is associated with a default payment vehicle when proximate to a POS terminal. As discussed previously with respect to block 345 in FIG. 3b, the user may enter a single action user input using any of the input devices.

As illustrated by block 350, the mobile device looks up the default payment vehicle associated with the single action user input in the memory. As illustrated in block 350 of FIG. 3b, the mobile device compares the single action user input to the associations between user input and payment vehicles in the memory.

As illustrated by block 380, the mobile device transmits payment information associated with the default payment vehicle to the POS terminal including an indicator that the transmission of payment information was initiated via a single action user input. In an embodiment, the payment information is transmitted similarly to the transmittal described in block 355 of FIG. 3b, but the payment information also includes some indication that the transmission occurred because of a single action user input. In some embodiments, the indication is an addition to the payment information, such as a code, digit, or identifier that allows the POS terminal and/or the financial institution to determine that that payment information was transmitted based on a single action. For example, payment information may include a binary digit where a 0 means that the transmission occurred based on multistep log-in procedures and a 1 means that the transmission occurred based on a single action user input.

As illustrated by block 382, the POS terminal receives payment information including the indicator from the mobile device. Similar to block 360 in FIG. 3b, the POS terminal receives the information wirelessly from the wireless payment network interface utilizing the network interface module. In some embodiments, the POS terminal receives the payment information including the indicator but does not recognize the indicator in the payment information. For example, the mobile device may conceal the indicator in the payment information that it transmits to the POS terminal.

As illustrated by block 384, the POS terminal uses the payment information with the indicator to request authorization from the financial institution for a financial transaction. As discussed in block 365, the POS terminal sends the payment information to the financial institution server to request authorization for the transaction. Here, however, the POS terminal also transmits the indicator to the financial institution. For example, the POS terminal may transmit the user's credit card number as well as a code indicating that the transaction originated from a single action user input to the credit card company.

As illustrated by block 386, the financial institution server determines from the received indicator that the pending transaction was initiated using a single action user input. In an embodiment, the financial institution server recognizes the indicator with the payment information. For example, the financial institution server may evaluate the codes associated with the payment information to determine if a binary code indicating a single action user input origination, such as a hotkey, is present.

As illustrated by block 388, the financial institution server determines whether to authorize the transaction based at least partially on rules specific to the single action input transactions. In an embodiment, the rules are default rules provided by the financial institution associated with the payment vehicle. For example, a credit card company may prohibit single action input transaction for purchases greater than five hundred dollars. In another embodiment, the rules are provided by the user. For example, the user may indicate that all purchases of less than five dollars can be approved via a single action user input. The rules may be provided by the user using a web interface, GUI, or other input device.

As illustrated by block 370, the POS terminal receives authorization for the transaction. This step is depicted and described in block 370 of FIG. 3b. In review, the POS terminal receives instructions from the financial institution server that the transaction is authorized and that the POS terminal can proceed with the transaction.

As illustrated by block 375, the POS terminal completes the transaction. This step is depicted and described in block 375 of FIG. 3b. Again, after the POS terminal receives authorization, e.g., the cash register receives an indication that sufficient funds are available for the purchase, the POS terminal will proceed with the purchase by debiting the funds from the user's payment vehicle and transferring the funds to an account associated with the cash register.

Alternative Configuration and Single-Action Payment Transmission Procedures

FIG. 4a provides a flow diagram illustrating an alternative process 400 for configuring a transaction authorization system, in accordance with some embodiments of the present invention.

As illustrated by block 405, the mobile device stores a unique default payment code in memory. In an embodiment, the unique default payment code is a code associated with the mobile device that can be used in place of an account number for payment information. The unique default payment code provides a secure method of transmitting payment information to a POS terminal. For example, the unique default payment code may be an alphanumeric code provided by the mobile device, user, or financial institution, and which is stored in the mobile device's memory. It should be understood that the unique default payment code may be another type of unique identifier and that the unique default payment code is not limited to alphanumeric codes.

As illustrated by block 410, the financial institution server stores the unique default payment code in memory. In an embodiment, the financial institution stores the unique default payment code associated with the user's mobile device. For example, the financial institution may request the user's unique default payment code and store it in the server for use with single action user input transactions.

As illustrated by block 415, the financial institution server prompts the user to select a default payment vehicle to associate with the default payment code stored on the user's mobile device. In an embodiment, the financial institution requests that the user identify an account or payment method accessible by the financial institution for associating with, or in some cases linking to, the unique default payment code. For example, the financial institution may provide a list of all potential payment vehicles associated with the financial institution and request that the user select one for use with the unique default payment code.

As illustrated by block 420, the user selects a default payment vehicle. In an embodiment, the user selects the default payment vehicle in response to the prompt from the financial institution server. For example, the user may identify a checking account as associated with the unique alphanumeric code stored in the memory of both the mobile device and the financial institution server.

As illustrated by block 425, the financial institution server associates the selected default payment vehicle with the unique default payment code in memory. For example, the financial institution server may link the user's selected checking account with the alphanumeric code stored in both the mobile device and the financial institution server. The financial institution server may change the association of the selected default payment vehicle with the default payment code based on a request from the user or based on instructions provided by the user. For example, the user may instruct the financial institution server to change the default payment vehicle associated with the unique default payment code from a gift card to a checking account when the gift card is drained of funds.

As illustrated by block 430, the mobile device prompts the user to select a single action user input to use as the quick pay input mechanism. In an embodiment, the mobile device provides a list of potential options to the user for the user to select from. For example, the mobile device may list a hotkey, a touchscreen icon, a voice command, and an accelerometer command as potential single action user inputs and request the user to select one.

As illustrated by block 435, the user selects a single action user input. For example, the user may select an option from a list on a screen or may select an option by performing the action (e.g., depressing a hotkey to select the hotkey).

As illustrated by block 440, the mobile device associates the default payment code with the selected single action user input in memory. In an embodiment, once the user has selected a single action user input the mobile device associates, or links, the user input with the unique default payment code in the memory of the device. For example, the user may have selected a hotkey and the mobile device then links activation of the hotkey with the unique default payment code in the memory of the device.

FIG. 4b provides a flow diagram illustrating an alternative process 400 for using the transaction authorization system of FIG. 4a to engage in a transaction at a point-of-sale, in accordance with some embodiments of the present invention.

As illustrated by block 445, the user enters a single action user input that is setup to be the quick pay mechanism. In an embodiment, the user has previously selected a single action user input that has been associated with the unique default payment code and stored in the memory of the mobile device. The user performs this pre-selected single action user input that has been setup as the quick pay mechanism. For example, the user may have previously selected a touchscreen icon as the quick pay mechanism and hence the user would select the appropriate touchscreen icon.

As illustrated by block 450, the mobile device wirelessly transmits the default payment code to the POS terminal. In an embodiment, in response to the user performing the single action user input that has been setup as the quick pay mechanism, the mobile device wirelessly transmits the default payment code to the POS terminal using the wireless payment network interface. For example, the mobile device may transmit the default payment code wirelessly over the network.

As illustrated by block 455, the POS terminal receives the default payment code. In an embodiment, the POS terminal receives the default payment code from the mobile payment device and identifies the code for use in other processes. For example, the POS terminal may receive the default payment code in an encrypted form and decrypts the code for use with the transaction authorization process.

As illustrated by block 460, the POS terminal sends the default payment code to the financial institution with an authorization request as if the payment code were any other account number. For example, the POS terminal sends the default payment code to the financial institution associated with the default payment code. Although the default payment code is not an account number, the POS terminal can treat the default payment code in much the same manner as standard account numbers.

As illustrated by block 465, the financial institution server determines from the received default payment code that the pending transaction was initiated using a single action user input and determines the default payment vehicle associated with the default payment code in memory. In an embodiment, the financial institution server recognizes the default payment code, determines that this means the transaction initiated by means of a single action user input, and identifies the payment vehicle associated with the payment code based on the association stored in the financial institution server's memory. For example, the financial institution server receives a default payment code, recognizes that the user triggered a hotkey to authorize the transaction, and looks up the checking account associated with the default payment code.

As illustrated by block 470, the financial institution server determines to authorize the transaction based at least partially on rules specific to single action input transactions and on account information associated with the default payment vehicle. In an embodiment, the rules are default rules provided by the financial institution. In another embodiment, the rules are provided by the user. The financial institution server determines to authorize the transaction based at least on part of the rules pertaining to the default payment code. For example, the financial institution may determine to authorize a transaction using the single action user input because the transaction is occurring during business hours based on a rule set up by the user. In another example, the financial institution determines to authorize the transaction using the single action user input because the transaction is for less than five dollars based on default rules provided by the financial institution and, in some cases, approved or accepted by the user.

As illustrated by block 475, the POS terminal receives authorization for the transaction. In an embodiment, the POS terminal receives authorization for the transaction from the financial institution server because the transaction complies with all rules established by the financial institution and/or user and because sufficient funds are available to perform the transaction.

As illustrated by block 480, the POS terminal completes the transaction. In an embodiment, the POS terminal completes the transaction by initiating debiting of the funds from the user's account and transferring the funds to an account associated with the POS terminal.

Wireless Input at POS as Single-Action Input

FIG. 5 provides a flow diagram of a process 500 where the single action input comprises a wireless signal received by the mobile device at the point-of-sale.

As illustrated by block 505, the user holds the mobile device proximate to a quick pay wireless transmitter located proximate to the POS terminal. In an embodiment, the user holds the mobile device proximate to the quick pay wireless transmitter so that the mobile device may receive a signal from the quick pay wireless transmitter. Hence, the term "proximate" is relative to the strength of the wireless transmitter and/or the receiver on the mobile device. For example, a mobile device may be able to receive a signal from a wireless transmitter if held within a foot of the wireless transmitter.

As illustrated by block 510, the quick pay wireless transmitter wirelessly transmits a particular quick pay input signal to any properly equipped mobile devices held nearby. In an embodiment, the quick pay wireless transmitter is continuously transmitting a particular quick pay input signal that can be received by any properly equipped mobile device. In another embodiment, the quick pay wireless transmitter is periodically emitting an input signal, or emitting the input signal when the POS terminal indicates that a transaction is requested. For example, when a user goes to pay for an item using the transaction authorization system in the current embodiment, the POS terminal may activate the quick pay wireless transmitter such that the mobile device can receive a signal if held proximate to the transmitter.

As illustrated by block 515, the mobile device receives the quick pay input signal. In an embodiment, the mobile device receives the quick pay input signal from the quick pay wireless transmitter. For example, the mobile device may receive the quick pay input signal using the wireless payment network interface.

As illustrated by block 520, the mobile device immediately looks up the default payment vehicle associated with the quick pay option in the memory in response to the quick pay signal. In an embodiment, the mobile device determines the payment vehicle associated with the quick pay signal after receiving the quick pay signal. For example, a credit card may be the default payment vehicle for the mobile device when the user holds the mobile device proximate to a quick pay wireless transmitter such that the mobile device receives the quick pay input signal.

As illustrated by block 525, the mobile device wirelessly transmits the payment information associated with the default payment vehicle to the POS terminal. In an embodiment, after the mobile device finds the default payment vehicle associated with the quick pay option in the memory of the mobile device the mobile device wirelessly transmits the payment information to the POS terminal. In some embodiments, the payment information is encrypted. In other embodiments, a secure connection is formed with the POS terminal before transmitting the payment information.

As illustrated by block 530, the POS terminal receives the payment information from the mobile device. For example, the POS terminal may receive the information from the mobile device over a wireless network. In an embodiment, the POS terminal decrypts the payment information after receiving it. In some embodiments, the POS terminal stores the payment information while in other embodiments the POS terminal immediately transmits the payment information to the financial institution server without saving the payment information.

As illustrated by block 535, the POS terminal uses the payment information to request authorization from the financial institution for a financial transaction. In an embodiment, the POS terminal sends the payment information along with the amount of the transaction to the financial transaction server for authorization. In another embodiment, additional information is sent to the financial transaction server, such as the identity of the merchant, the time of the transaction, and the category of the transaction. For example, the merchant may send not only the payment information and the amount of the requested purchase, but also the merchant's identity so that the identity can be compared to any rules established by the financial institution or user.

As illustrated by block 540, the POS terminal receives authorization and completes the transaction. As discussed previously, the POS terminal receives authorization if the sufficient funds are available to cover the transaction and if the transaction conforms to all rules related to single action user input transactions. Once authorization is received, the POS terminal completes the transaction by debiting the user's account and transferring the funds to an account associated with the POS terminal.

Single-Action Payment Transmission Process Involving Receipt of Transaction Information FIG. 6 provides a flow diagram illustrating an alternative process 600 for communicating payment information to a POS terminal in response to a single action input, in accordance with some embodiments of the invention.

As illustrated by block 605, the user provides a particular single action input to the mobile device. For example, the user may trigger a hotkey or select a "pay now" icon on a phone when the user desires to conduct a transaction. For example, the user may be attempting to purchase a product at a store. When the user checks out at the cash register, the user presses the hotkey or selects the icon and, thereby, automatically and quickly, authorizes transfer of the user's payment information to the POS terminal, as will be discussed herein.

In an embodiment, the mobile device analyzes the input 610. For example, the processor may analyze personalized input to determine whether the user is allowed to authorize the transaction. The processor may use facial recognition software, voice recognition software, or speech recognition software to identify the user and if the user is successfully identified the processor moves onto the next step. In some embodiments, the processor uses speech recognition software to determine instructions from the user on how the transaction should proceed. For example, the processor may identify the name of the account that the user wishes to pay for the transaction. For example, the user may say "pay from the money market account." In this example, the processor uses both voice recognition software to determine that the user is allowed to authorize the transaction and speech recognition software to determine which account, here the money market account, the funds for the transaction should come out of. It should be understood that the processor can analyze input in a variety of ways and the aforementioned examples are not limiting. For example, the processor can analyze the frequency of the input for market research purposes.

In some embodiments, the processor opens a wireless payment network interface up to receive a connection signal 615. For example, the processor may activate the wireless payment network interface to receive any connection signals in the vicinity. In an embodiment, opening up the wireless payment network interface makes it available for receiving the connection signal. In some embodiments, opening a wireless payment network interface up to receive a connection signal includes making the wireless payment network interface discoverable by other network devices. For example, the POS terminal may be continuously searching for network interfaces. Until the user opens a wireless payment network interface up to receive a connection signal, however, the POS terminal is unable to locate the interface device. This provides both security for the user when the user does not wish to conduct a transaction using the transaction authorization system and power saving functions by not transmitting a network signal until the user desires to do so.

In some embodiments the POS terminal emits a connection signal 620. The POS terminal can emit the connection signal continuously. In another embodiment, the POS terminal emits the connection signal only when the merchant attempts to make a connection to the user's mobile device. In some embodiments, the connection signal includes details of the transaction. For example, the connection signal can include the transaction amount, the transaction merchant, the transaction category, and/or the transaction location. In a still further embodiment, the connection signal includes encryption techniques so that both the transaction details and the user account information are protected from third parties.

In some embodiments, the mobile device receives the connection signal from the POS terminal 630. In an embodiment, because the processor is available to receive the connection signal and the POS terminal is emitting the connection signal, the network interface device is able to receive the connection signal from the POS terminal. For example, once the network interface device is made discoverable and the POS terminal discovers the network interface device, the connection signal can be transmitted to the network interface device, including the transaction details.

In an embodiment, the processor determines the payment information to transfer based on the input and/or the connection signal 635. For example, the processor may determine the payment information to transfer based on analysis of the input from the user. If the user is using speech recognition software to determine which account the transfer should be made from, the processor can make that determination at this step. In another embodiment, a different type of input indicates to the system that the transfer should be made from different accounts. For example, a hotkey may be linked to a checking account, a first application may be linked to a credit account, and a second application may be linked to a rewards account. In an embodiment, the user is able to customize which input is linked to which account.

In another embodiment, the processor determines the payment information to transfer based on the connection signal, or based on a combination of the input and the connection signal. In some embodiments, the processor determines the payment information to transfer based on instructions provided by the user. In these embodiments, the processor determines the payment information to transfer based on details of the transaction, the user, or both. U.S. patent application Ser. No. 13/017,823 to Grigg et al., entitled "Mobile Transaction Device Security System," and filed concurrently herewith, describes such a device, system, and method in greater detail and is hereby incorporated by reference in its entirety.

In some embodiments, the wireless payment network interface establishes a secure connection with the POS terminal 640. As discussed previously, the transaction authorization system includes encryption techniques for protecting the user's account information and input, in some embodiments. These encryption techniques may include establishing a secure connection with the POS terminal so that third parties are not able to gain access to the payment information during the transfer between the mobile device and the POS terminal. As is known, many types of encryption techniques are possible and can utilize either the mobile device alone, the POS terminal alone, or a combination of the mobile device and the POS terminal.

In a still further embodiment, the wireless payment network interface transmits the default payment information to the POS terminal 645. For example, the wireless payment network interface may transfer the payment information over the secure connection. The wireless payment network interface may transmit the user's account number, the user's identity, the financial institution where the user's account is hosted, or any other information necessary to complete the transaction. In an exemplary embodiment, the wireless payment network interface transfers only the information necessary to complete the transaction with the merchant, preserving the user's privacy in all other respects. In another embodiment, the wireless payment network interface also transmits virtual coupons or discounts associated with the user and/or the financial institution. The transfer of the user's payment information can be automatically encrypted as well.

In some embodiments, the POS terminal completes the transaction 650. In an embodiment, the POS terminal completes the transaction using the standard procedures for transferring funds from the user's account to a merchant's account. For example, in the same manner that the merchant would complete a credit card transaction after swiping the user's credit card, the merchant may receive the user's account number from the network interface device, communicate with the user's financial institution to determine whether sufficient funds are available to cover the transaction, and initiate a transfer of funds from the user's account to the merchant's account if sufficient funds are available.

Exemplary Graphical User Interfaces

FIG. 7 provides an example of a graphical user interface 700 associated with a transaction authorization system 702 for a mobile device, in accordance with one embodiment of the present invention. In some embodiments of the invention, the graphical user interface 700 is generated on the screen of a mobile phone by an electronic wallet application installed on the mobile phone. In other embodiments of the invention, the graphical user interface 700 is generated on the screen of a mobile phone by other software stored in the mobile phone.

The graphical user interface 700 includes a variety of tabs 704 for viewing and editing information related to the transaction authorization system 702. One of the tabs can be a home tab 706 that provides general information related to the transaction authorization system 702. For example, the home tab 706 can include information related to the current user 708 and the input for authorizing a transaction 710. In an embodiment, the accounts associated with each type of input are also disclosed. For example, a checking account may be active for the hotkey 712 while a credit account may be active for the application 714. In another embodiment, available but not activated input types are also indicated 716, for example fingerprint scanning may be available on some devices yet the user may not have input an image of his fingerprint for comparison purposes. In a still further embodiment, input types that are not supported by the current mobile device may be indicated 718, such as for example iris scanning. In another embodiment, the user is able to edit 720 the activation and saved input for the various input types directly from the graphical user interface 700. In another embodiment, the user is able to disable 722 the transaction authorization system 702 to preserve the user's security if another person uses the device. In an embodiment (not shown), the user is able to disable the transaction authorization system remotely so that if the mobile device is lost, the user is still able to disable the system.

Turning now to FIG. 8, an example of a graphical user interface 800 associated with accounts in the transaction authorization system 702 is provided, in accordance with one embodiment of the present invention. The interface includes the tabs 704 that allow the user to switch between multiple interfaces. In an embodiment, one tab provides content relating to account information 802. In some embodiments, the account information interface 800 includes content related to the user's active accounts 804. For example, the active account information 804 may include details relating to checking accounts 806 and credit accounts 808. Account information may include the account balance 810, whether the user has set a low balance alert 812, and voice commands for indicating to the transaction authorization system that the user desires to pay for the transaction from the specified account 814.

In an embodiment, the account balance is updated on a regular basis, such as after every transaction. In another embodiment, the user may trigger updating of the account balance by selecting a button 818 on the interface. The account balance may be updated on any frequency.

In some embodiments, the user sets a low balance alert to let the user know if the balance goes below a predetermined level. Users may desire such an alert because of the ease of payment with the transaction authorization system. In an embodiment, the low balance alert 812 informs the user that the low balance has been reached. In another embodiment, however, the low balance alert disables the transaction authorization system so that the user must use other methods of authenticating the user's identity before completing a transaction. In a still further embodiment, multiple levels of low balance alerts may be included: a first level that informs the user that the account balance is getting low, and second level that disables the transaction authorization system. In an exemplary embodiment, the user is able to customize the levels for the low balance alerts by editing 820 them through the graphical user interface.

In another embodiment, voice commands 814 are saved in the transaction authorization system. For example, the user may record a sample of the user's voice into the transaction authorization system so that the user can authorize payment by speaking into the mobile device. The transaction authorization system includes speech recognition software in some embodiments. By analyzing the user's speech, the system can determine the account from which the funds should be transferred.

In a still further embodiment, information specific to the type of account may also be present in the graphical user interface. For example, a credit account may include the credit maximum 816 available to the user. In an embodiment not shown, the user may set upper limits on credit spending similar to the low balance limits for other accounts. For example, if the user is approaching the credit maximum on the credit account, the user can be informed that the limit is close or the transaction authorization system can automatically disable the system so that the user does not attempt to charge more than the account limit.

In some embodiments, the user is able to delete accounts 822 or add accounts 824 through the graphical user interface. It should be understood that the disclosed examples of controlling the transaction authorization system through the graphical user interface are not limiting. Given the disclosure herein, additional features are available to the user and may be viewed, edited, and saved through the graphical user interfaces associated with the system.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

These computer-executable program instructions may be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:
1. A mobile phone comprising:
an input device configured to receive input from a user;
a wireless transmitter configured to transmit wireless signals to a financial transaction device associated with a financial transaction being performed by the user;
a memory device comprising default payment information stored therein; and
a processor communicably coupled to the input device, the wireless transmitter, and the memory device and configured to:
receive a predetermined list of one or more merchants from the user, wherein the predetermined list discloses merchants at which single action inputs may be used to conduct transactions;
determine that the user is performing a transaction at the transaction device;
receive a particular input from a user via the input device as the single action input;
receive an identity of the merchant from the transaction device;
determine that the merchant is on the predetermined list of one or more merchants; and
in response to receiving the particular input alone, use the wireless transmitter to wirelessly transmit the default payment information to the transaction device without requiring any additional input from the user and without requiring authentication of the user before wirelessly transmitting the default payment information when the merchant is on the predetermined list of one or more merchants.

2. The mobile phone of claim 1, wherein the memory device comprises an electronic wallet application stored therein, and wherein the processor is configured to use the wireless transmitter to wirelessly transmit the default payment information to the transaction device without requiring the launching of the electronic wallet application prior to wirelessly transmitting the default payment information.

3. The mobile phone of claim 1, wherein the input device comprises a user input device, and wherein the particular input comprises a particular user input.

4. The mobile phone of claim 1, wherein the particular input comprises activation of a particular key.

5. The mobile phone of claim 1, wherein the input device comprises a touchscreen, and wherein the particular input comprises activation of an icon displayed on the touchscreen.

6. The mobile phone of claim 1, wherein the memory comprises payment information stored therein about a plurality of payment vehicles associated with the user, and wherein the default payment information is associated with one of the plurality of payment vehicles.

7. The mobile phone of claim 1, wherein the processor is further configured to:
receive a second particular input via an input device; and
in response to receiving the second particular input alone, use the wireless transmitter to wirelessly transmit second default payment information to the transaction device without requiring any additional user input before wirelessly transmitting the second default payment information.

8. The mobile phone of claim 1, wherein the input device comprises a microphone, a voice recognition system, and a speech recognition system, and wherein the particular input comprises a user-created verbal phrase that is analyzed to authorize the user using the voice recognition system and to determine which of a plurality of financial accounts is used for the transaction using the speech recognition software.

9. The mobile phone of claim 1, wherein the input device comprises a biometric device, and wherein the particular input comprises biometric input entered through the biometric device.

10. The mobile phone of claim 1, wherein the transaction device comprises a point-of-sale device.

11. The mobile phone of claim 1, wherein the input device comprises a wireless receiver, and wherein the particular input comprises a wireless signal transmitted from a wireless transmitter associated with or located proximate to the transaction device.

12. The mobile phone of claim 1, wherein the particular input comprises a combination of user inputs entered simultaneously.

13. The mobile phone of claim 1, wherein the processor is configured to use the wireless transmitter to wirelessly transmit the default payment information to the transaction device immediately after receiving the particular input.

14. The mobile phone of claim 1, wherein the processor is configured to allow the user to define the particular input and associate it with user-selected default payment information.

15. The mobile phone of claim 1, wherein the processor is configured to use the wireless transmitter to wirelessly transmit the default payment information to the transaction device by launching and using an electronic wallet application stored in the memory device.

16. The mobile phone of claim 1, wherein the processor is configured to use the wireless transmitter to wirelessly transmit the default payment information to the transaction device by only partially launching an electronic wallet application stored in the memory device.

17. The mobile phone of claim 1, wherein the processor is configured to permit a user to wirelessly transmit payment information using multiple actions different from the single action input.

18. The mobile phone of claim 1, wherein the input device comprises an accelerometer, and wherein the particular input comprises tapping the mobile phone against a device associated with or proximate to the transaction device.

19. The mobile phone of claim 1, wherein the input device is persistently displayed to the user.

20. The mobile phone of claim 1, wherein the wireless transmitter comprises a near field communication device configured to transmit wireless near field communication signals comprising payment information.

21. The mobile phone of claim 1, wherein the processor is configured to alert the user when a balance associated with the default payment information reaches a predetermined threshold.

22. The mobile phone of claim 1, wherein the processor is configured to transmit an indicator to the transaction device along with the default payment information, wherein the indicator can be used by one of the transaction device, a merchant's computer system, or a financial institution's computer system to determine that the default payment information was transmitted by the mobile phone using a single action payment feature where the default payment information is wirelessly transmitted to the transaction device without requiring any additional user input before wirelessly transmitting the default payment information.

23. The mobile phone of claim 1, wherein the default payment information comprises a default payment code that can be transmitted by a point-of-sale system to a financial institution's computer system, and then used by the financial institution's computer system to determine a default payment vehicle associated with the default payment code.

24. A method comprising:
storing payment information for at least one payment vehicle in memory of a mobile phone of a user;
receiving a predetermined list of one or more merchants from the user, wherein the predetermined list discloses merchants at which single action inputs may be used to conduct transaction;
associating particular input received using an input device of the mobile phone with a default payment vehicle selected from the at least one payment vehicle;
determining that the user is performing a transaction at a transaction device;
receiving the particular input from a user via the input device;
receiving an identity of the merchant from the transaction device;
determining that the merchant is on the predetermined list of one or more merchants; and
using a wireless transmitter of the mobile phone to wirelessly transmit payment information for the default payment vehicle to a transaction device in response to receiving the particular input alone and without requiring any additional input from the user and without requiring authentication of the user before wirelessly transmitting the payment information when the merchant is on the predetermined list of one or more merchants.

25. The method of claim 24, further comprising looking up the default payment vehicle associated with the particular input in the memory in response to receiving the particular input.

26. The method of claim 24, further comprising wirelessly transmitting an indicator that the wireless transmittal of payment information was initiated via a single action input with the payment information.

27. The method of claim 24, further comprising analyzing the particular input to determine the payment information to wirelessly transmit.

28. The method of claim 27, wherein analyzing the particular input comprises evaluating verbal input using speech recognition software.

29. The method of claim 24, further comprising establishing a secure connection with a point of sale device prior to transmitting the payment information.

30. The method of claim 24, further comprising prompting a user to associate the particular input with the default payment vehicle.

31. The method of claim 24, further comprising:
  receiving account information associated with the default payment vehicle; and
  determining whether the payment information can be wirelessly transmitted based on predetermined rules, wherein the payment information is wirelessly transmitted if the account information conforms to the predetermined rules.

* * * * *